United States Patent
Shiomi

(10) Patent No.: US 6,650,361 B1
(45) Date of Patent: Nov. 18, 2003

(54) IMAGING APPARATUS CONTROL METHOD, AND A COMPUTER PROGRAM PRODUCT HAVING COMPUTER PROGRAM CODE THEREFOR

(75) Inventor: Yasuhiko Shiomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/212,940

(22) Filed: Dec. 16, 1998

(30) Foreign Application Priority Data

Dec. 17, 1997 (JP) .............................. 9-348302
Dec. 25, 1997 (JP) .............................. 9-358605

(51) Int. Cl.[7] ............................................. H04N 5/225
(52) U.S. Cl. ................................................. 348/218.1
(58) Field of Search ........................ 348/208.99, 218.1, 348/220.1, 231.1, 219.1, 231.99

(56) References Cited

U.S. PATENT DOCUMENTS

| | | | | |
|---|---|---|---|---|
| 5,018,017 A | * | 5/1991 | Sasaki et al. | 348/231.3 |
| 5,754,226 A | * | 5/1998 | Yamada et al. | 348/219.1 |
| 6,018,363 A | * | 1/2000 | Horii | 348/219.1 |
| 6,108,036 A | * | 8/2000 | Harada et al. | 348/219.1 |
| 6,130,709 A | * | 10/2000 | Sekine et al. | 348/208.8 |
| 6,266,086 B1 | * | 7/2001 | Okada et al. | 348/218.1 |

* cited by examiner

*Primary Examiner*—Andrew Christensen
*Assistant Examiner*—Tia M. Harris
(74) *Attorney, Agent, or Firm*—Morgan & Finnegan, LLP

(57) ABSTRACT

In a digital still camera, it is cumbersome for the camera user to set an image photographing method and saving method of the photographed image, which are suitable for each object. When a photographing mode suitable for a moving object such as a "sports mode" is set, normal photographing is done, and the photographed image is lossless-compressed and saved. When a photographing mode suitable for a still object such as a "portrait mode" is set, a high-resolution image is captured by pixel shift photographing. The photographed image is lossy-compressed and saved.

11 Claims, 29 Drawing Sheets

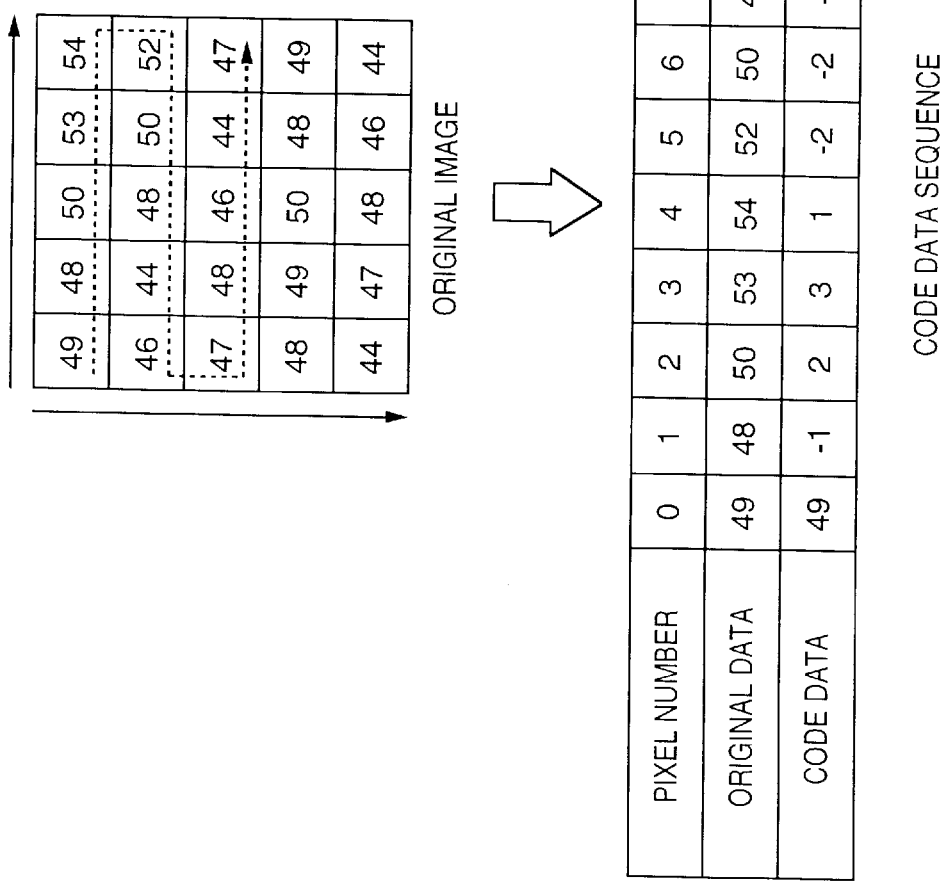

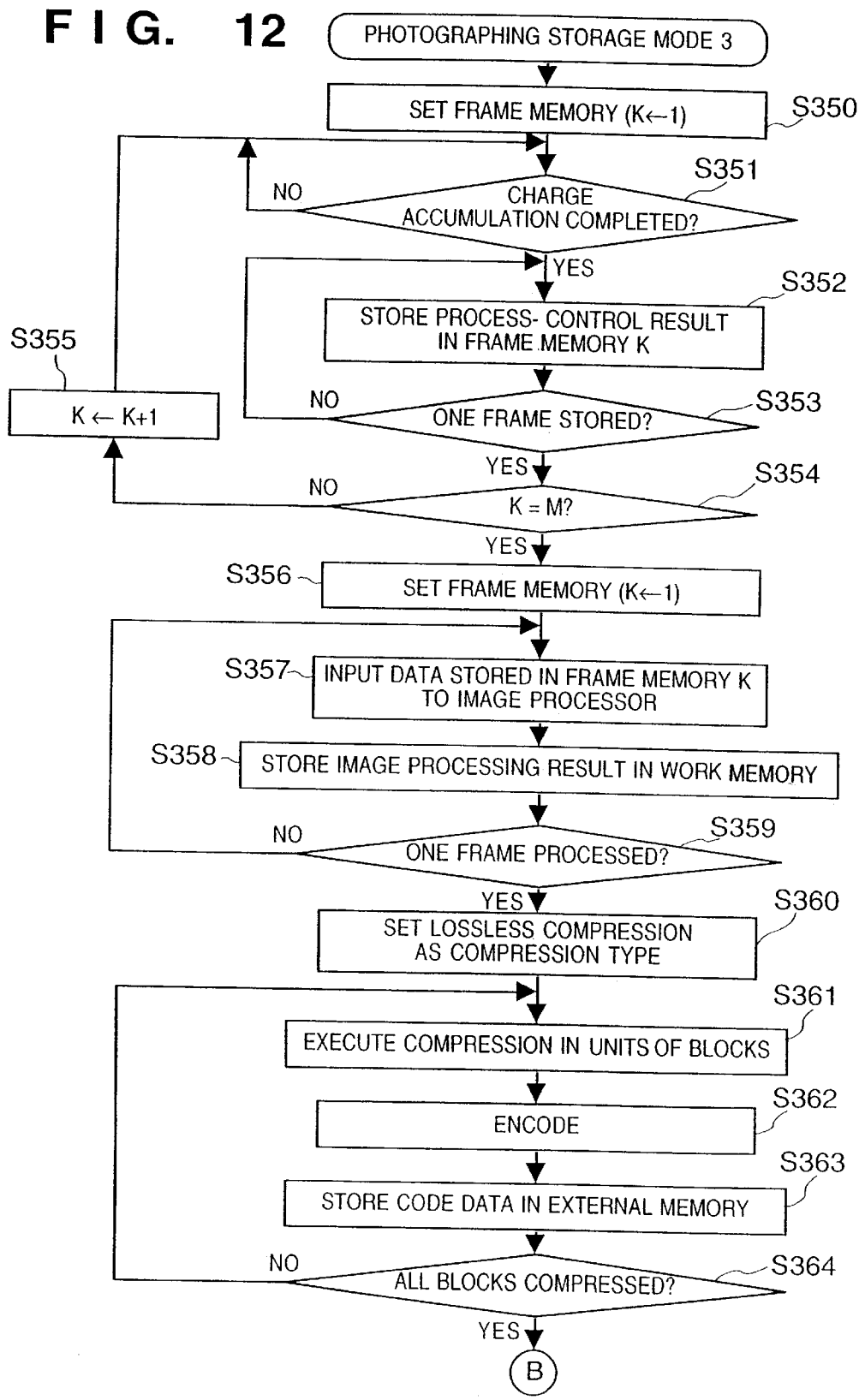

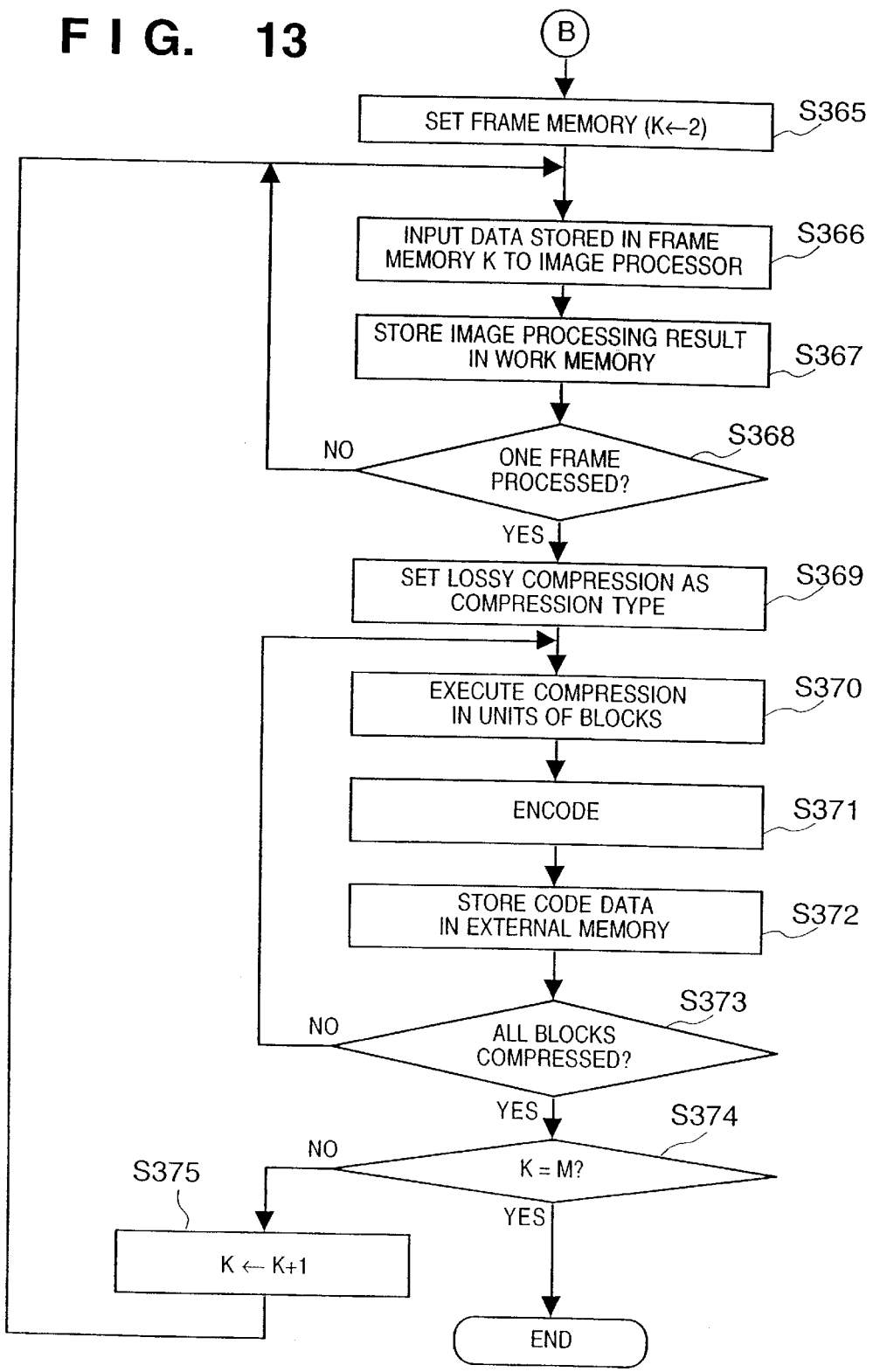

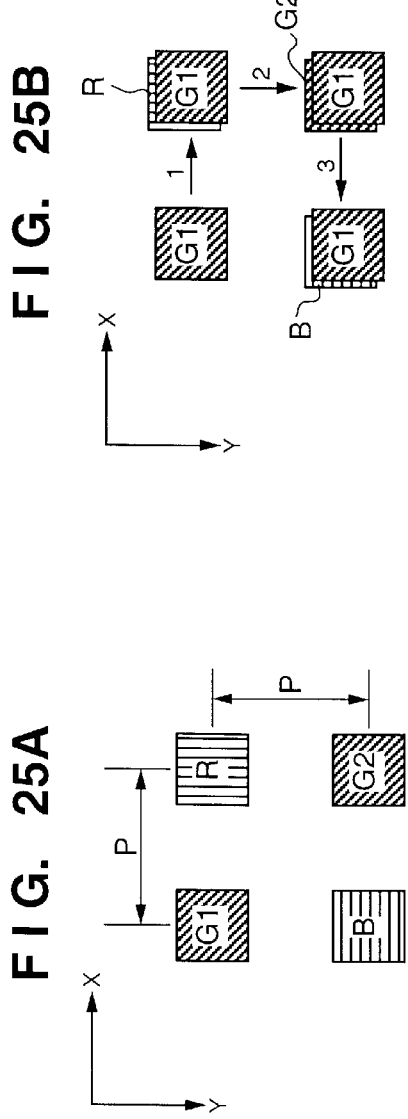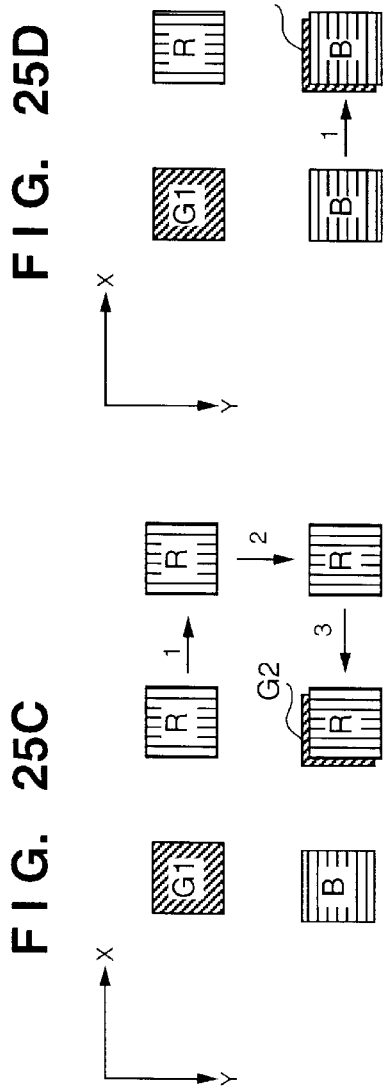

IMAGING APPARATUS CONTROL METHOD, AND A COMPUTER PROGRAM PRODUCT HAVING COMPUTER PROGRAM CODE THEREFOR

BACKGROUND OF THE INVENTION

1. Field of the Invention

The present invention relates to an imaging apparatus and method, and its control method and, more particularly, to an imaging apparatus such as a digital camera which saves a photographed image as an electrical signal in the apparatus, and an imaging method.

2. Description of the Related Art

Along with developments of imaging processing techniques in recent years, imaging apparatuses such as digital still cameras that use these techniques have been developed remarkably. FIG. 18 shows the arrangement of a digital still camera, and its operation will be briefly described below.

Referring to FIG. 18, reference numeral 91 denotes a camera operation unit, which includes a main switch, release switch, and the like of a camera. The camera operation unit 91 is operated by the user, and an overall controller 80 detects a change in state of the main switch, and starts power supply to other building blocks.

An object image within the photographing range is formed on an imaging unit 82 via a main photographing optical system 81, and an electrical signal output from the imaging unit 82 is converted into a predetermined digital signal via an A/D (Analog to Digital) converter 83 in turn in units of pixels. The converted digital signal is input to a process controller 84. The process controller 84 generates R, G, and B color signals on the basis of the pixel data sent from the imaging unit 82. Before normal photographing, these color signals are transferred to a video memory 89 via a memory controller 85 periodically, e.g., in units of frames, thus making a finder display or the like using a monitor display 90.

When the user photographs by operating the camera operation unit 91, image data for one frame sent from the process controller 84 is stored in a frame memory 86 in response to a control signal from the overall controller 80, and the data in the frame memory 86 is compressed by the memory controller 85 and a work memory 87 on the basis of a predetermined compression format. The compressed data is stored in an external memory 88 comprising a nonvolatile memory such as a flash memory or the like. According to the advance of the imaging apparatus development technique in recent years, a camera capable of selectively obtaining higher-resolution image data in addition to the normal photographing is available. Such high-resolution image data is compressed in the predetermined format in the same manner as above, and is stored in the external memory 88.

When the user observes already photographed image data, the compressed image data stored in the external memory 88 is expanded to normal photographed image data by the memory controller 85, and the expanded data is transferred to the video memory 89. In this way, the user can observe the photographed image via the monitor display 90.

As described above, in the digital still camera, when photographed image data is stored in a memory or the like, the image data is stored after it is compressed in a specific compression format or at a specific compression rate irrespective of its photographing conditions or photographing scene, or is compressed by a compression method or at a compression rate set by the user himself or herself.

However, in the digital still camera, since the photographed image data is uniformly saved by the camera irrespective of its contents, image data photographed in an optimal state (compression format) is not always saved. The same applies to a case wherein photographing for obtaining high-resolution image data is made, i.e., when the size of image data becomes large.

Even when the user himself or herself can set the saving method of the photographed image in advance, it is very cumbersome for the user to appropriately set the image compression method in correspondence with the intended photographed image. Hence, if the user has to set the saving method every time he or she takes photographs, he or she cannot immediately take photographs when the need for it arises, and misses a so-called shutter chance. Also, when an image photographing method must be set in addition to the saving method of the photographed image, such operations are harder except for expert users.

Along with advance of the digital technique in recent years, many imaging apparatuses capable of digital recording, i.e., so-called digital cameras have been proposed. Some of these digital cameras comprise a compact display device such as a finder or a TFT (Thin Film Transistor) liquid crystal display device for displaying an image to be photographed or a photographed image, a camera shake correction device for correcting a camera shake, and a large-capacity storage device such as a flash memory or the like for saving JPEG (Joint Photographic Experts Group)-compressed images.

The resolution of an image photographed by the above-mentioned digital camera is determined by the type of CCD used in the digital camera. Hence, in order to photograph a high-resolution image, a CCD having many light-receiving elements, e.g., million pixels or more, is required, resulting in an expensive digital camera.

On the other hand, a digital camera having a CCD with a small number of pixels improves the resolution by interpolation. Since the pixel value obtained by interpolation is the average value of surrounding pixel values, no problem is posed in a region with relatively flat gradation characteristics, but an image edge blurs in an image edge region where the gradation characteristics change largely.

SUMMARY OF THE INVENTION

The present invention has been made to solve the aforementioned problems, i.e., to relieve the user of cumbersome setups of the image photographing method and the saving method of photographed image data, and has as its object to provide an imaging apparatus and method, which can set the photographing method and image saving method in correspondence with the currently selected photographing mode.

In order to achieve the above object, a preferred embodiment of the present invention discloses an imaging apparatus which comprises an imaging unit for forming an object image, and generating an image signal by photoelectric conversion, an optical shift unit for optically shifting an imaging position of the object image in the imaging unit, generation means for generating a single image from a plurality of images obtained by the imaging unit by a plurality of shifts using the optical shift unit, and storage means for converting an image obtained by the imaging unit or the image generated by the generation means into a predetermined data format, and storing the converted image in a storage medium, comprising: an operation unit for manually setting a photographing mode of the imaging apparatus; and control means for setting the data format and controlling supply of an image to the storage means in correspondence with the set photographing mode.

It is another object of the present invention to provide an imaging apparatus and method, which can set the photographing method and image saving method in correspondence with the state of the apparatus upon photographing.

In order to achieve the above object, a preferred embodiment of the present invention discloses an imaging apparatus which comprises an imaging unit for forming an object image, and generating an image signal by photoelectric conversion, an optical shift unit for optically shifting an imaging position of the object image in the imaging unit, photographing means for storing, in a memory, a plurality of images obtained by the imaging unit by a plurality of shifts using the optical shift unit, generation means for generating a single image from the plurality of images stored in the memory, and storage means for converting the image stored in the memory or the image generated by the generation means into a predetermined data format, and storing the converted image in a storage medium, comprising: a sensor for detecting a state of the apparatus upon photographing; and control means for setting the data format and controlling supply of an image to the storage means in correspondence with the detected state of the apparatus.

It is still another object of the present invention to provide an imaging apparatus and method, which can set the photographing method and image saving method in correspondence with the free capacity of a storage medium that saves photographed images.

In order to achieve the above object, a preferred embodiment of the present invention discloses an imaging apparatus which comprises an imaging unit for forming an object image, and generating an image signal by photoelectric conversion, an optical shift unit for optically shifting an imaging position of the object image in the imaging unit, generating means for generating a single image from a plurality of images obtained by the imaging unit by a plurality of shifts using the optical shift unit, and storage means for converting an image obtained by the imaging unit or the image generated by the generation means into a predetermined data format, and storing the converted image in a storage medium, comprising: an operation unit for manually setting a photographing mode of the imaging apparatus; and control means for setting the data format and controlling supply of an image to the storage means in correspondence with the set photographing mode, wherein the control means sets the data format and controls supply of an image to the storage means in correspondence with a free storage capacity of the storage medium.

It is still another object of the present invention to provide an imaging apparatus and method which can capture a high-resolution image with low cost by setting a photographing method that corresponds to the characteristics of an object.

In order to achieve the above object, a preferred embodiment of the present invention discloses an imaging apparatus which comprises an imaging unit for forming an object image, and generating an image signal by photoelectric conversion, an optical shift unit for optically shifting an imaging position of the object image in the imaging unit, generation means for generating a single image from a plurality of images obtained by the imaging unit by a plurality of shifts using the optical shift unit, and storage means for converting an image obtained by the imaging unit or the image generated by the generation means into a predetermined data format, and storing the converted image in a storage medium, comprising: detection means for detecting characteristics of the object; and control means for setting a shift method of photographing using the optical shift unit in accordance with the detected characteristics of the object.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view for explaining lossless compression of a photographed image in the first embodiment;

FIGS. 12 and 13 are flow charts showing the operation in photographing storage mode 3 in the second embodiment;

FIGS. 25A to 25D are views for explaining the pixel shift method shown in FIG. 23 in detail.

DESCRIPTION OF THE PREFERRED EMBODIMENTS

The preferred embodiments of an imaging apparatus and method, and its control method according to the present invention will be described in detail hereinafter with reference to the accompanying drawings.

First Embodiment

[Arrangement]

Figure 1:
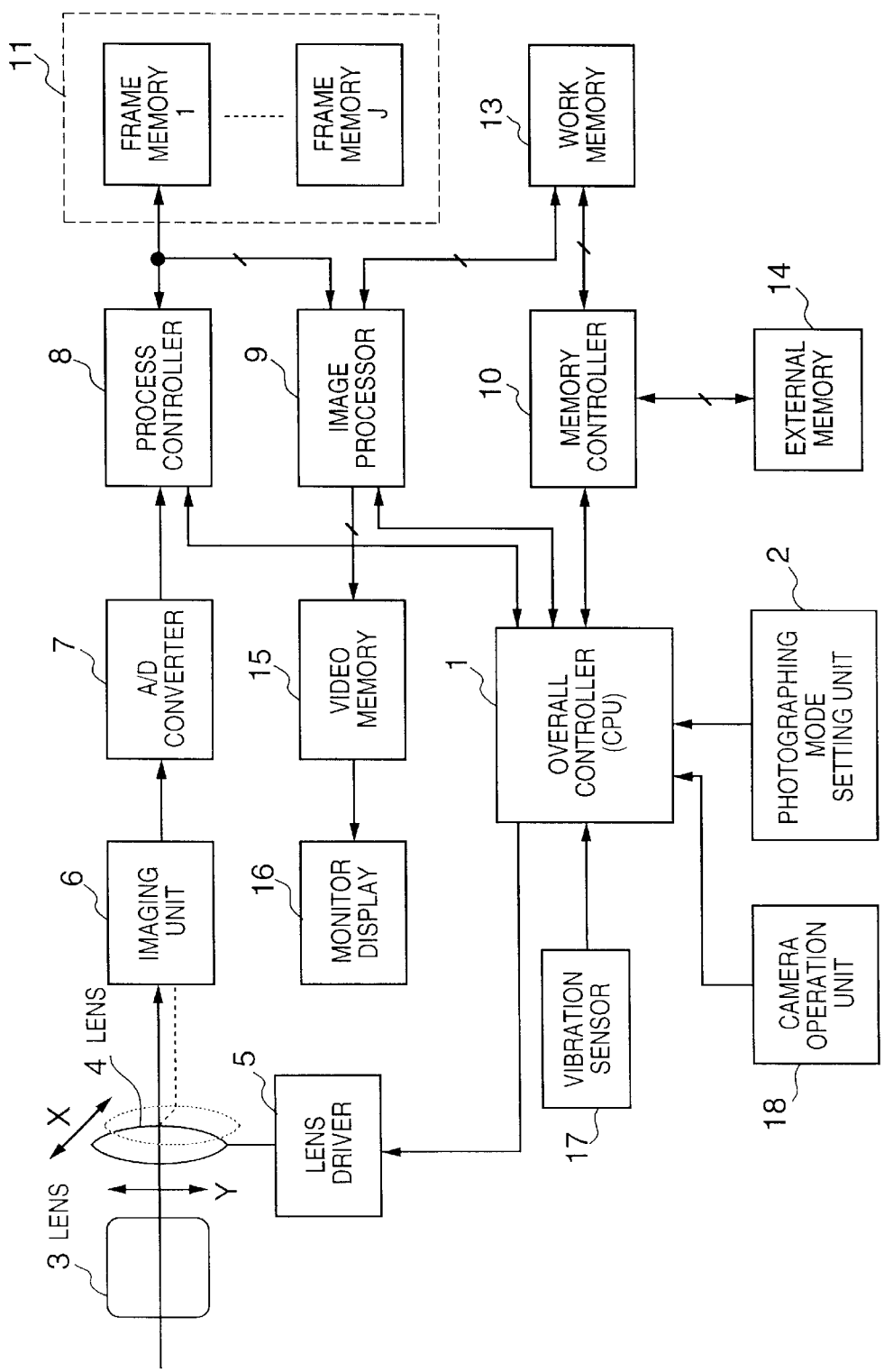
FIG. 1 is a block diagram showing the arrangement of a digital still camera according to the first embodiment of the present invention.

FIG. 1 is a block diagram showing the overall arrangement of a digital still camera (to be simply referred to as a camera hereinafter) in this embodiment. Referring to FIG. 1, reference numeral 1 denotes an overall controller which includes a microprocessor (containing a CPU, ROM, RAM, and the like) for controlling the overall camera. Reference numeral 2 denotes a photographing mode setting unit for setting the photographing mode of the camera. The setting unit 2 has switches and the like, which allow the user to set a "sports mode" suitable for photographing a moving object, a "portrait mode" suitable for photographing a still object, and the like. Reference numeral 18 denotes a camera operation unit for instructing the start of photographing by the camera and the like. The camera operation unit 18 comprises a main switch, release switch, and the like.

Reference numeral 3 denotes a main photographing optical system; and 4, an optical unit for spatially translating an object image formed on an imaging unit 6, as will be described later. The optical unit 4 uses a so-called shift correction optical system, as disclosed in Japanese Patent Laid-Open No. 3-186823. Normally, the shift correction optical system is used in a camera shake prevention mechanism for a camera. Reference numeral 17 denotes a vibration sensor which normally uses two angular velocity sensors called vibration gyros, and independently detects angular vibrations about two different axes, thus detecting the camera shake amount of the camera. In the camera of this embodiment, the overall controller 1 converts the output from the vibration sensor 17 into data for driving the optical unit 4, and moves lenses in the optical unit 4 via a lens driver 5, thus always stably forming an object image on a predetermined imaging plane even by hand-held photographing.

An object image signal formed on the imaging unit 6 is converted into predetermined digital data via a series of video signal processes to be described below in the blocks before a monitor display 16 under the control of the overall controller 1.

[Operation]

Charges corresponding to an object image, which have been accumulated for a predetermined period of time by the imaging unit 6 comprising, e.g., a CCD, are read out in turn, and luminance information of the object corresponding to the charge amount is converted into digital data by an A/D converter 7. Note that an optical color filter for separating photographed light into three primary colors R, G, and B, or the like is adhered onto the imaging unit 6. Hence, the imaging unit 6 outputs signals indicating R, G, and B colors.

The output from the A/D converter 7 is input to a process controller 8, and is subjected to dark level correction, gamma conversion, and the like. After that, the processed data is input to an image processor 9.

Figure 2:
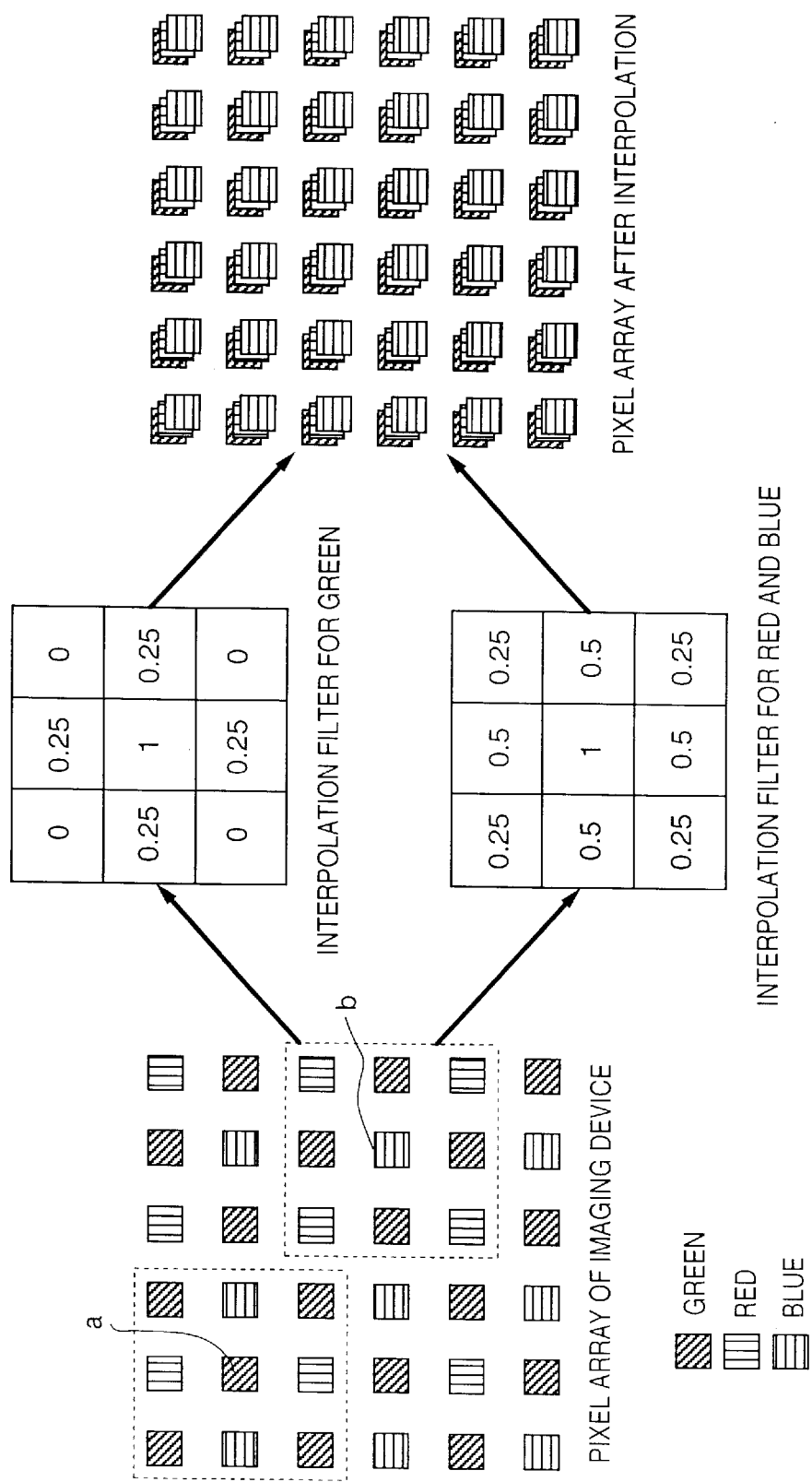
FIG. 2 is a view for explaining the interpolation process in the first embodiment.

The image processing in the image processor 9 will be explained below with reference to FIG. 2. The image processor 9 generates RGB data in units of pixels using different interpolation filters for green (G) and for red (R) and blue (B) with respect to the optical color filter array of the imaging unit 6, as shown in FIG. 2. Note that the optical color filter has a normal Bayer pattern, the green interpolation filter has a checkerboard pattern, and the interpolation filter for red and blue has a line sequential pattern, which are different from each other. In general, when the imaging unit 6 comprises a single imaging device, the imaging device has a Bayer pattern, as depicted on the left side in FIG. 2. Hence, since all pixels of image data obtained from the imaging device do not always have all of RGB color information, the image processor 9 generates RGB color information at all pixel points on the imaging device by interpolation filter calculations using 3×3 matrices depicted at the center of FIG. 2.

In the pixel array of the imaging device depicted on the left side in FIG. 2, green data on pixel a can be obtained by respectively multiplying luminance data of pixel a and its eight surrounding pixels by coefficients of the green interpolation filter. The coefficient of the green interpolation filter corresponding to the position of pixel a is "1", those of the upper, lower, and right, and left neighboring pixels are "0.25", and those of the obliquely neighboring pixels are "0". Therefore, in the green data on pixel a, the output value of pixel a is dominant.

On the other hand, green data on pixel b is obtained by respectively multiplying luminance data of pixel b and its eight surrounding pixels by coefficients of the green interpolation filter. In this case, since the green output value of pixel b that outputs blue data is "0", the green data on pixel b is determined by averaging the green output values of the four, upper, lower, right, and left neighboring pixels.

In the red and blue interpolation filter calculations as well, red and blue data at all pixel points are determined by substantially the same sequence except for their filter coefficients, which are different from those of the green interpolation filter. In this fashion, R, G, and B color output data for all the pixel points can be finally generated, as depicted on the right side in FIG. 2.

The RGB data calculated in this way by the image processor 9 are transferred to a video memory 15 in units of frames to make finder display on the monitor display 16.

The operation including the image processing before photographing has been explained. The operation including image processing upon photographing will be explained below.

Upon photographing, the output from the process controller 8 is transferred to a frame memory unit 11 having J frame memories 1 to J, and all pixel data are temporarily stored. The image processor 9 then processes the image data stored in this frame memory unit 11 by the above-mentioned method, and RGB data of the respective pixels output from the image processor 9 are transferred to a work memory 13. Furthermore, a memory controller 10 compresses the image data stored in the work memory 13 in a predetermined compression format, and saves the compressed data in an external memory 14 comprising a nonvolatile memory such as a flash memory or the like. Note that the external memory 14 may be a SMART medium which uses an EEPROM, a CF card that uses a flash memory, and the like. Also, magnetic storage media such as a floppy disk (FD), magneto optical (MO) disk, hard disk (HD) mounted on a PC card, and the like can be used.

A case will be explained below wherein the user observes an already photographed image.

Image data saved in the external memory is temporarily transferred to the memory controller 10, and is expanded there in correspondence with the predetermined compression format. The expanded data is transferred to the work memory 13. Furthermore, the image data on the work memory 13 is transferred to the video memory 15 via the image processor 9. In this way, the already photographed image can be displayed on the monitor display 16.

[Photographing Sequence]

The photographing sequence in the camera of this embodiment will be briefly described below with reference to the flow chart in FIG. 3. Note that the photographing sequence to be described below is controlled by the overall controller 1.

In the first step S100, it is checked if the main switch in the camera operation unit 18 is ON. If the user has turned on the main switch, the flow immediately advances to step S101 to supply electric power to all the blocks of the camera shown in FIG. 1. Subsequently, the vibration sensor 17 is enabled in step S102 to begin to detect the camera shake amount. In step S103, the optical unit 4 is driven via the lens driver 5, as described above, thus starting camera shake correction.

In step S104, the output from the imaging unit 6 is converted into a video signal via the A/D converter 7, process controller 8, and image processor 9, as described above. In step S105, a monitor display corresponding to the video signal is started. Hence, in step S105 and the subsequent steps, the above-mentioned video signal processing repeats itself in units of frames of the monitor display. In step S106, whether or not the release switch in the camera operation unit 18 is ON is detected to check if the user has released the shutter button. If the release switch is ON, photographing is immediately started.

Upon starting photographing, the photographing mode setup of the camera is checked in step S107. In the camera of this embodiment, the photographing mode setting unit 2 allows the user to set a so-called "sports mode" for mainly photographing a moving object, or a so-called "portrait mode" for mainly photographing a still object. If the "sports mode" is set, the flow advances to step S108 to set a "normal photographing mode" as a mode upon photographing. In step S109, photographing and storage of photographed data in the frame memory unit 11 are made in "photographing storage mode 1". The operation in this "photographing storage mode 1" will be described later.

On the other hand, if the "portrait mode" is set, the flow advances to step S110 to set a "pixel shift photographing mode" as a mode upon photographing. In step S111, photographing and storage of photographed data in the frame memory unit 11 are made in "photographing storage mode 2". The operation in this "photographing storage mode 2" will be described later.

In this fashion, after photographed data is stored in the frame memory unit 11 in either mode, it is checked in step S112 if the release switch is OFF. If the release switch is kept ON, the processing stays in step S112; otherwise, the flow returns to step S106. Note that the sequence returns to step S100 if the main switch is turned off, although not shown in FIG. 3.

As described above, in this embodiment, photographing is automatically switched to "normal photographing" or "pixel shift photographing" in correspondence with the photographing mode such as the "sports mode" or "portrait mode" set by the user, and the saving method (including the compression method) of image data in the frame memory unit 11 is switched.

The operations in "photographing storage mode 1" and "photographing storage mode 2" above will be described in detail below.

[Photographing storage Mode 1] "Photographing storage mode 1" used when the "sports mode" is set will be explained below with reference to the flow chart in FIG. 4.

The output from the process controller 8 is temporarily stored in one of a plurality of frame memories in the frame memory unit 11. For this purpose, for example, "1" is set in parameter k for selecting a frame memory, thus designating frame memory 1, in step S200. In step S201, the control waits for completion of charge accumulation in the imaging unit 6. When the imaging unit 6 comprises, e.g., a CCD or the like, charges generated by photoelectric conversion are immediately transferred to a transfer unit upon completion of accumulation for a predetermined period of time. Hence, even while the generated charges are read out in turn, the next accumulation has already been started.

In step S202, the above-mentioned process control is done in units of pixel data in the process controller 8, and the processing results are sequentially stored in frame memory k (frame memory 1 in this case). If it is determined in step S203 that all pixel data for one frame have been stored in frame memory k, the flow advances to step S204.

In step S204, the storage contents of frame memory k are transferred to the image processor 9 to generate RGB data in units of pixels by the interpolation described above. In step S205, the RGB data are temporarily transferred to the work memory 13. This processing continues for one frame, and if it is determined in step S206 that processing for one frame is complete, the flow advances to step S207.

In steps S207 to S211, an actual photographed image is compressed and its data is saved. In step S207, lossless compression is set as the image compression method in the memory controller 10. As the lossless compression, DPCM (Differential Pulse Code Modulation) or the like is used. DPCM modulates and encodes only differences between neighboring pixels of image data. According to this method, a compression rate (data size of compressed image/data size of original image×100%) with respect to the original image is as low as about 50%, but encoded photographed data can be completely decoded to reclaim the original image independently of the type of object. Hence, DPCM is suitably used when the user does not want any drop of image quality due to image compression.

FIG. 6 shows an example of compression by DPCM, and the compression process will be explained below. Assuming that an original image has a two-dimensional array of luminance signals (or R, G, and B color signals), as depicted by the upper matrix in FIG. 6, the array of the original image is converted into a linear array, as shown in the lower table in FIG. 6. This conversion is implemented by tracing pixels of the original image in turn from the upper left to the right and, upon reaching the right-end pixel, tracing pixels from the one immediately below the right-end pixel to the left. In this manner, the pixel data of the original image are sequentially converted into a linear array, and the differences between neighboring pixel data on this linear array are encoded, thus compressing the data.

Figure 4:
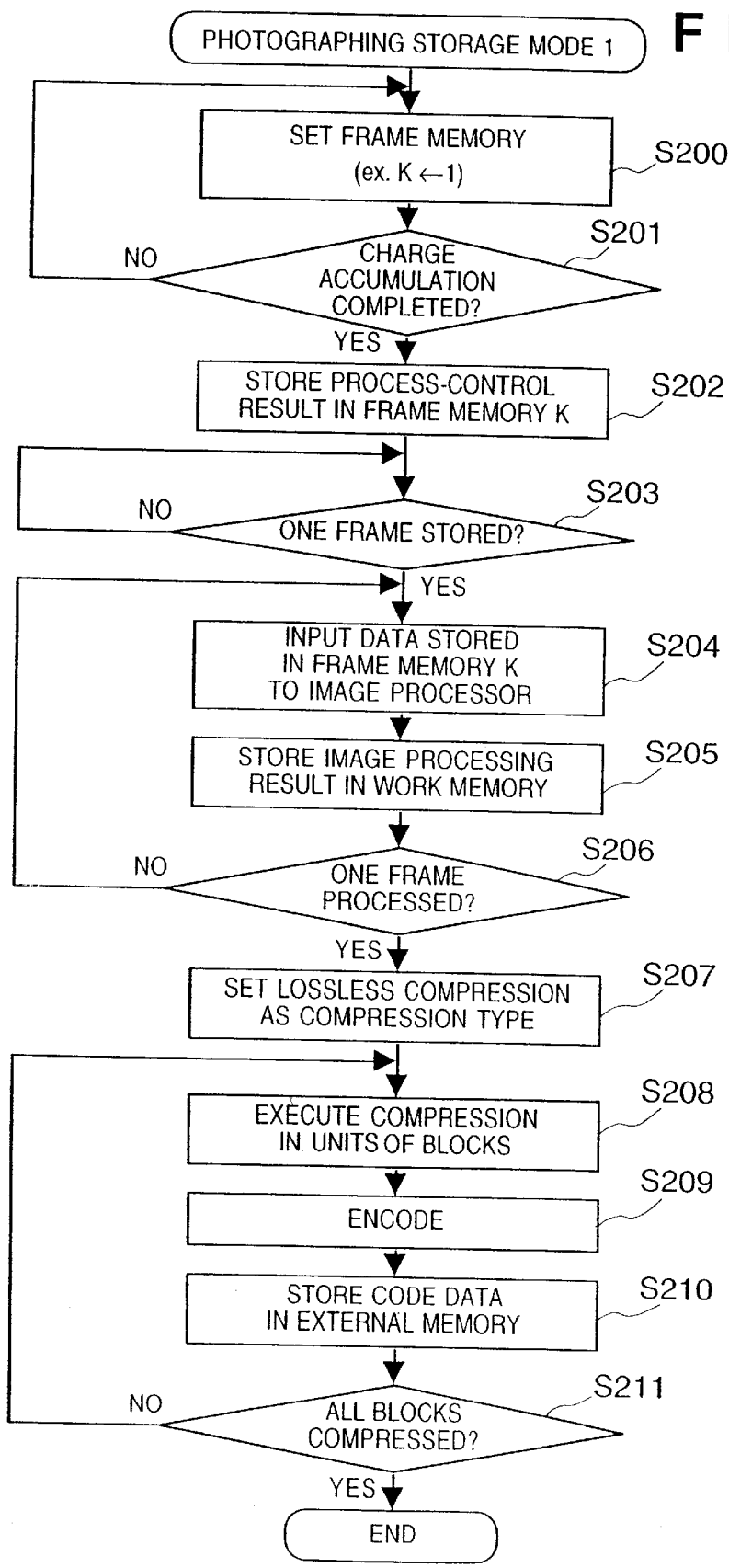
FIG. 4 is a flow chart showing the operation in photographing storage mode 1 of the first embodiment.

Hence, lossless compression such as DPCM is executed in units of predetermined blocks of an original image in step S208 in FIG. 4, and the compressed image data is converted into code data using, e.g. Huffman coding or the like in step S209. Note that the lossless compression need not always be done in units of blocks. Huffman coding assigns a larger code length to data with lower probability of occurrence to encode data. In step S210, code data as the encoded image data is sequentially stored in the external memory 14. If it is determined in step S211 that compression of the entire image (all blocks) and saving of the compressed data in the external memory 14 are complete, the processing in "photographing storage mode 1" ends. Of course, the processing in steps S208 to S211 repeats until compression of the entire image (all blocks) and saving of the compressed data in the external memory 14 are completed.

[Pixel Shift Photographing]

Prior to the description of "photographing storage mode 2" used when the "portrait mode" is set, pixel shift photographing as the photographing method of "photographing storage mode 2" will be described with reference to FIG. 7.

Figure 7:
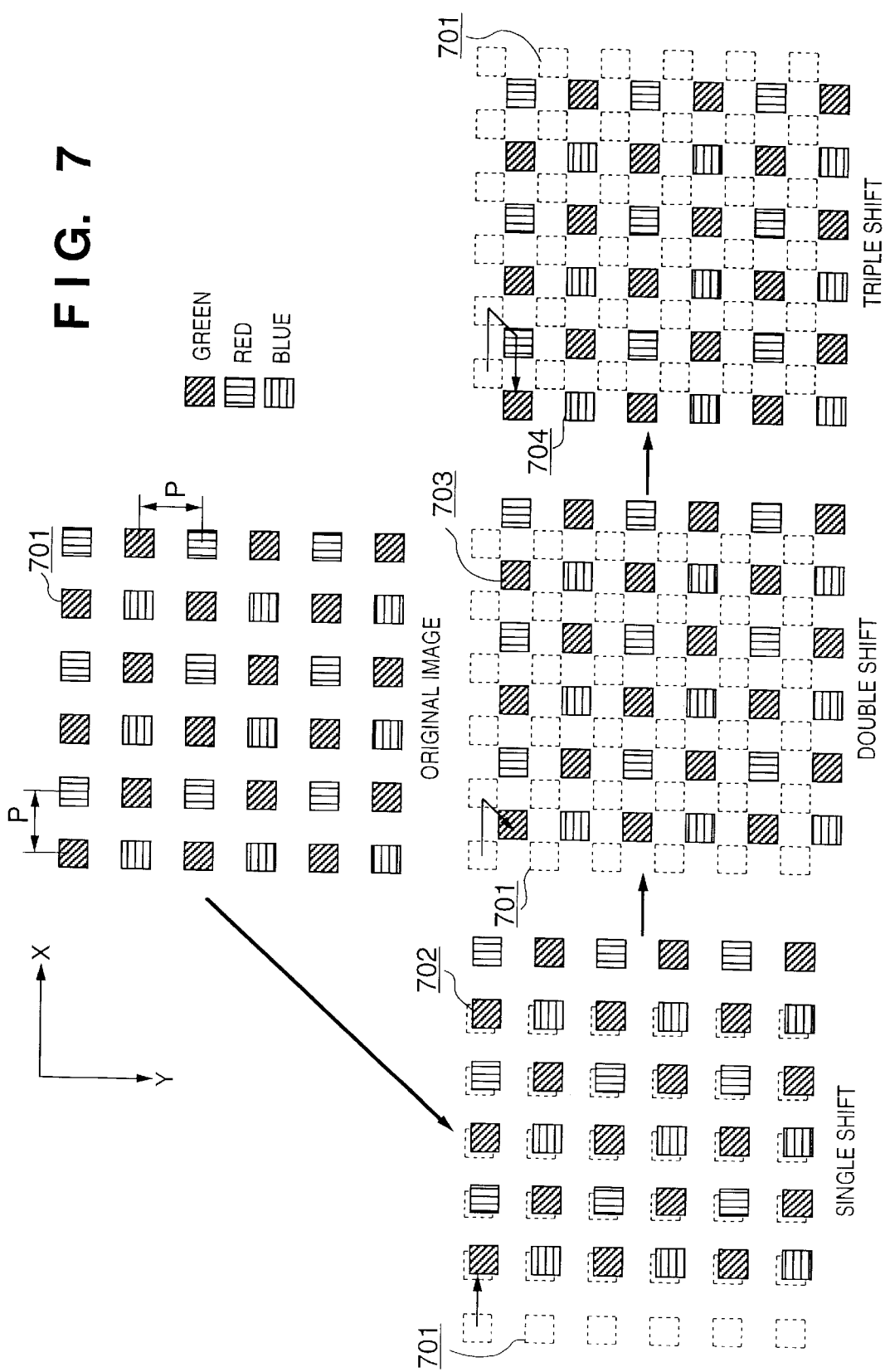
FIG. 7 is a view for explaining the principle of pixel shift photographing in the first embodiment.

The upper matrix in FIG. 7 depicts the RGB array of an initial image 701, which has a Bayer pattern, as described above. When the optical unit 4 is decentered by a predetermined amount in the X-direction in FIG. 7 during the next one frame period, an image 702, which has been shifted by one pixel pitch P from the initial image 701 in the horizontal direction, as indicated by the lower left matrix in FIG. 7, can be obtained. This process will be referred to as "the first shift" hereinafter. With this single shift, the spatial frequency of an image can be doubled in the X-direction in principle.

Subsequently, by decentering the optical unit 4 in the first shift state in the −X- and Y-directions by a predetermined amount, an image 703, which has been shifted from the first shift image 702 by −P/2 in the X-direction and P/2 in the Y-direction, as indicated by the lower central matrix in FIG. 7, can be obtained. This process will be referred to as "the second shift" hereinafter. Furthermore, by decentering the optical unit 4 in the second shift state in the −X-direction again by a predetermined amount, an image 704, which has been shifted from the second shift image 703 by P in the X-direction, as indicated by the lower right matrix in FIG. 7, can be obtained. This process will be referred to as "the third shift" hereinafter.

In this way, when the initial image 701, and the first, second, and third shift images 702, 703, and 704, which are shifted by predetermined pixel pitches, are photographed, the spatial frequency of the image can be nearly doubled in both the X- and Y-directions by combining these four photographed image data.

Note that the operation called "pixel shift" in this embodiment is to shift the imaging position on the imaging plane, as can be seen from the above description. That is, "pixel shift" does not actually shift pixels of the imaging device, but a shift of the imaging position can be considered equivalent to a pixel shift. Hence, in this specification, the operation for shifting the imaging position on the imaging plane will be referred to as "pixel shift", and photographing with "pixel shift" will be referred to as "pixel shift photographing".

[Photographing storage Mode 2]

Figure 5A:
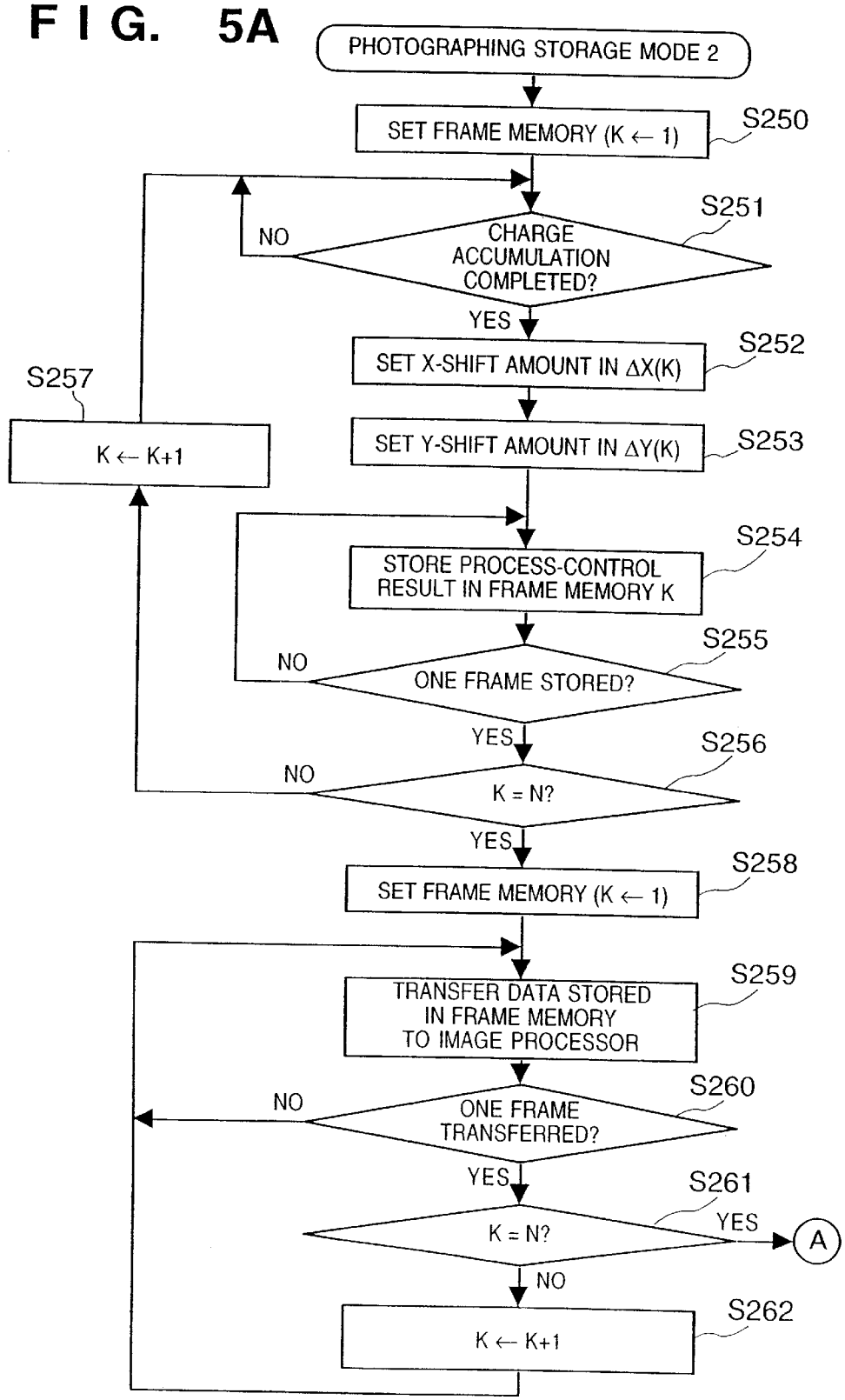
FIGS. 5A and 5B are flow charts showing the operation in photographing storage mode 2 in the first embodiment.
Figure 5B:
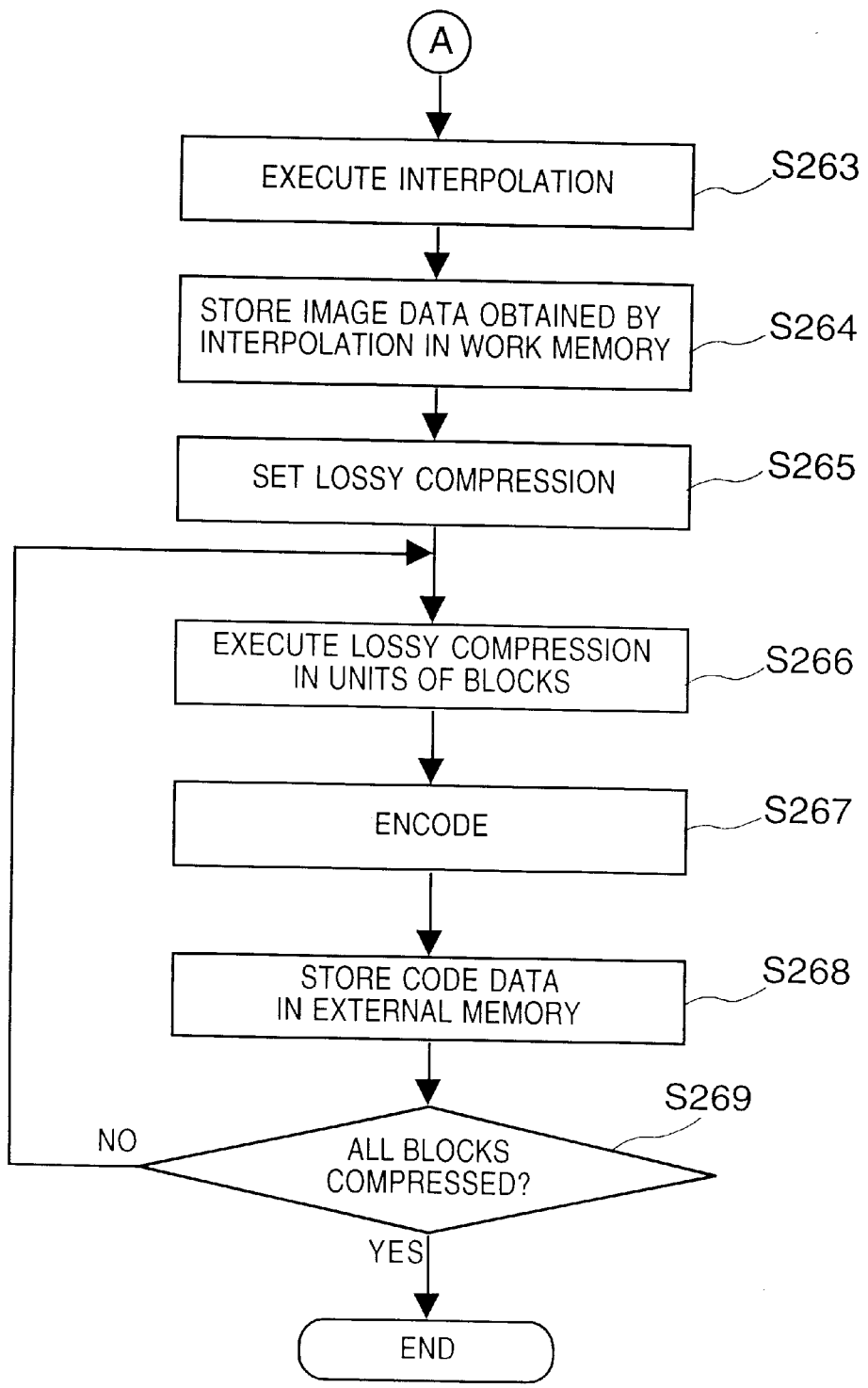

The operation in "photographing storage mode 2" with pixel shift photographing will be explained below with reference to the flow charts in FIGS. 5A and 5B.

In step S250, "1" is set in parameter k for selecting a frame memory for storing the output from the process controller 8, thus designating frame memory 1. In step S251, the control waits for completion of charge accumulation in the imaging unit 6.

Upon completion of charge accumulation corresponding to the initial image 701 shown in FIG. 7 in the imaging unit 6, drive amounts $\Delta X(K)$ and $\Delta Y(K)$ for decentering the optical unit 4 are set in steps S252 and S253 to attain the first shift, and the optical unit 4 is decentered via the lens driver 5. In this case, a value for shifting the object image from the initial image 701 by one pixel pitch P on the imaging plane is set in the first drive amount $\Delta X(1)$, and zero is set in $\Delta Y(1)$ not to decenter the optical unit 4 in the Y-direction.

In step S254, the process controller 8 executes the aforementioned process control of individual pixel data, and the processing results are sequentially stored in frame memory K (frame memory 1 in this case). If it is determined in step S255 that image data for one frame corresponding to the initial image 701 has been stored in frame memory 1, the flow advances to step S256.

It is checked in step S256 if the value of parameter K is N ("4" in this embodiment). If NO in step S256, K is incremented by 1 in step S257, and it is checked again in step S251 if charge accumulation for the next one frame is complete. Upon completion of charge accumulation, a value for shifting the image by half a pixel pitch −P/2 is set in $\Delta X(2)$ and a value for shifting the image by half a pixel pitch P/2 is set in $\Delta Y(2)$ in steps S252 and S253. After that, the operations in steps S254 to S257 repeat themselves. At that time, frame memory 2 stores an image corresponding to the image 702 shown in FIG. 7.

Furthermore, upon executing steps S252 and S253 when K=3, a value for shifting the image by one pixel pitch −P is set in $\Delta X(3)$ and zero is set in $\Delta Y(3)$ in turn. On the other hand, upon executing steps S252 and S253 when K=4, P/2 is set in $\Delta X(4)$ and −P/2 is set in $\Delta Y(4)$ to set zero decentering amount of the optical unit 4.

In this way, by repeating steps S251 to S257 until the value K becomes equal to N ("4" in this embodiment) in step S256, images for four frames, which correspond to the images 701 to 704 in FIG. 7 and have been shifted by one or a half pixel pitch in the X-direction and/or Y-direction, are stored in frame memories 1 to 4.

Figure 8:
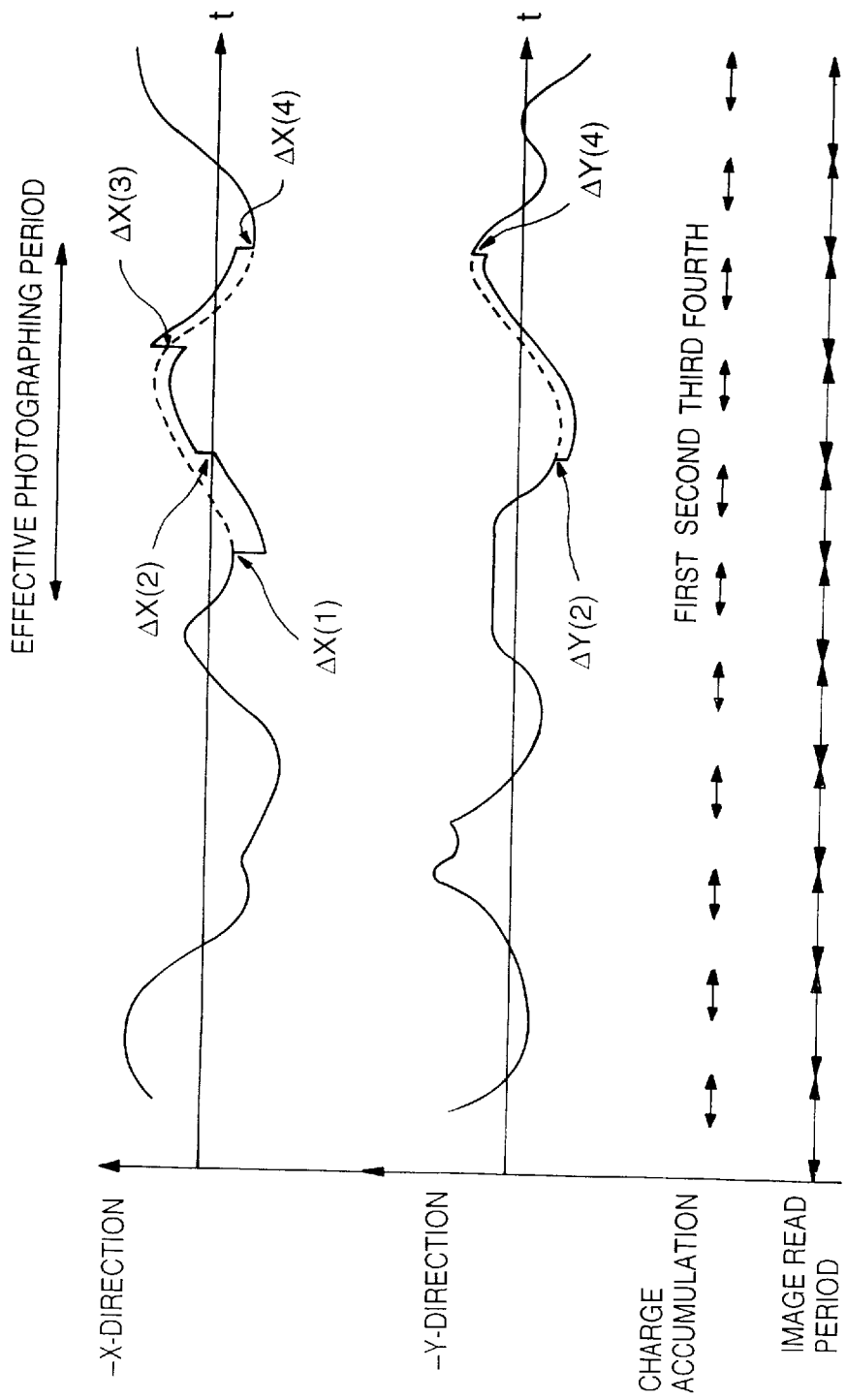
FIG. 8 is a chart for explaining the movement of a correction optical system upon pixel shift photographing in the first embodiment.

FIG. 8 shows the movement of the optical unit 4 upon pixel shift photographing, and the movement will be described in detail below. FIG. 8 illustrates the movements of an object image in the X- and Y-directions by the optical unit 4 in relation to a time axis t.

Since camera shake correction is being made before photographing, the optical unit 4 is moving the object image in the X- and Y-directions in correspondence with the output from the vibration sensor 17 even before an effective photographing period shown in FIG. 8.

During the effective photographing period, the optical unit 4 is decentered by an amount corresponding to $\Delta X(1)$ in only the X-direction after completion of the first charge accumulation, and the second charge accumulation starts while continuing camera shake correction in that state. After completion of the second charge accumulation, the optical unit 4 is decentered by amounts corresponding to $\Delta X(2)$ and $\Delta Y(2)$ in the X- and Y-directions, and the third charge accumulation then starts. Upon completion of the third charge accumulation, the optical unit 4 is decentered by an amount corresponding to $\Delta X(3)$ in only the X-direction. Upon completion of the fourth charge accumulation, the decentered amounts in the X- and Y-directions are reset to complete pixel shift photographing.

In this fashion, images for four frames are obtained by pixel shift photographing. Subsequently, in step S258 and the subsequent steps, high-density image data obtained by pixel shift photographing is converted into RGB information.

In step S258, the value of parameter K is set at "1" to designate the frame memory which stores the image data obtained by the first pixel shift photographing. Subsequently, the image data stored in frame memory 1 is transferred to the image processor 9 (S259). In this case, unlike in "photographing storage mode 1" mentioned above, no interpolation is executed, and it is checked in step S260 if transfer for one frame is complete. If it is determined in step S260 that transfer for one frame is complete, it is checked in step S261 if the value K is equal to N ("4" in this embodiment), so as to check if all the photographed image data have been transferred. If all the photographed image data have not been transferred yet, K is incremented by "1" in step S262, and the flow returns to step S259 to start transfer of image data stored in the next frame memory.

Upon completion of transfer of all the photographed data, the flow advances to step S263 to interpolate using all the photographed image data.

Figure 9:
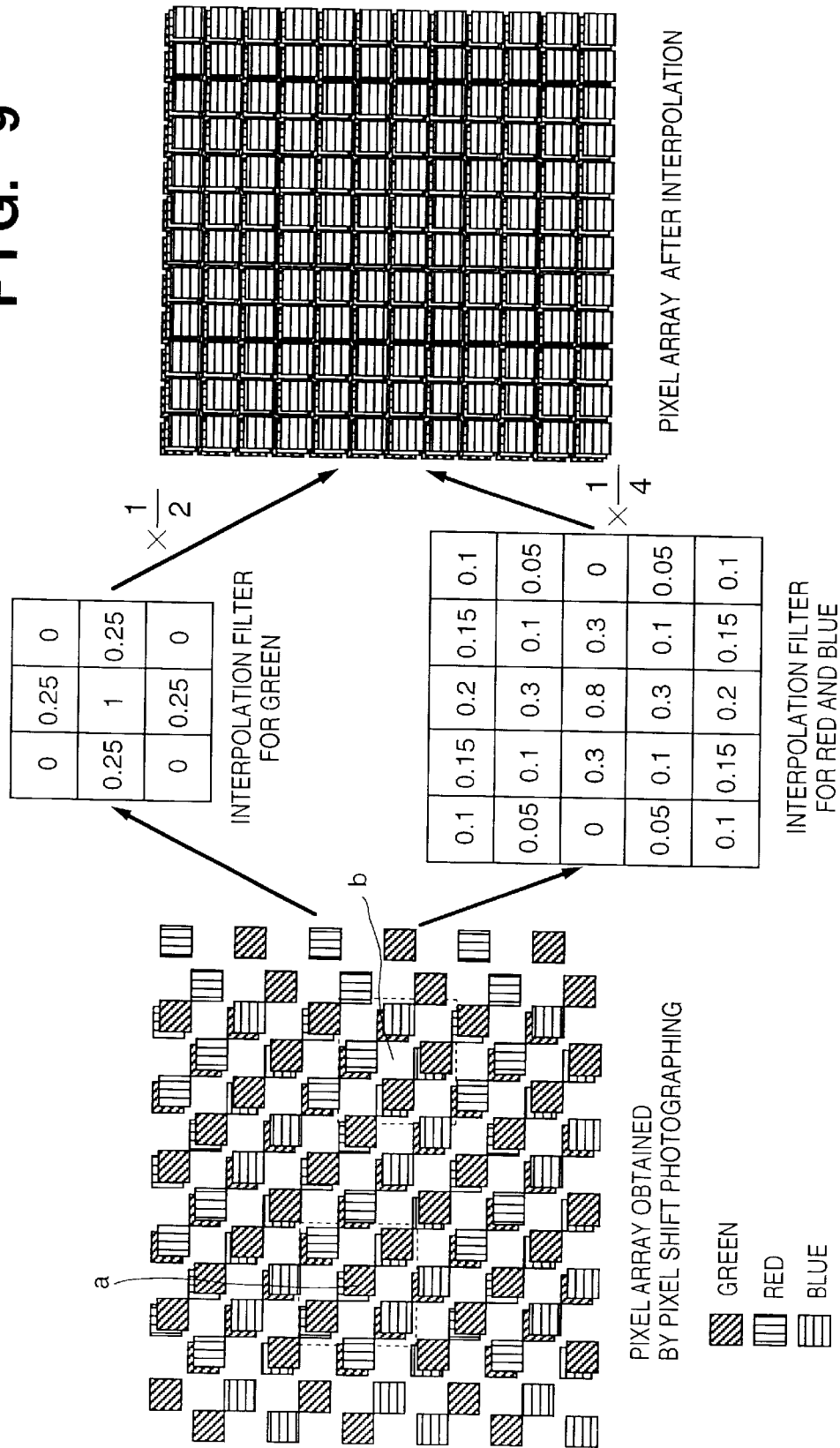
FIG. 9 is a view for explaining the interpolation process upon pixel shift photographing in the first embodiment.

The interpolation process will be explained below with reference to FIG. 9. The left matrix in FIG. 9 shows the array of pixel data obtained by pixel shift photographing, which has a spatial frequency nearly twice that of the imaging elements in the Bayer pattern shown in FIG. 2 in both the X- and Y-directions. In order to obtain RGB data doubled in both X- and Y-directions from that pixel data array, filter calculations using interpolation filters configured by central matrices shown in FIG. 9 are made.

As for the green component, the upper central 3×3 matrix in FIG. 9, which is the same as that in FIG. 2, suffices. For example, when green data at the position of pixel a in the left pixel data array in FIG. 9 is to be generated, luminance data of pixel a and its eight surrounding pixels bounded by the dotted line need only be multiplied by the corresponding coefficient of the green interpolation filter. In this case, since the coefficient corresponding to the green output at the position of pixel a is "1", those of the upper, lower, and right, and left neighboring pixels are "0.25", and those of the obliquely neighboring pixels are "0", the output value of pixel a is dominant in the green data on pixel a.

On the other hand, in order to generate green data of a pixel corresponding to position b in the left pixel data array shown in FIG. 9, luminance data of the eight pixels around position b bounded by the dotted line need only be multiplied by the corresponding coefficients of the green interpolation filter. However, since there is no green data at position b, green data corresponding to that position is generated by the average value of the upper, lower, right, and left neighboring green data.

As for the red and blue data, more complex processing than green data is required. As can be seen from the left pixel data array shown in FIG. 9, red and blue data can be interpolated using immediately neighboring pixel data in the X-direction, but must be interpolated using pixel data at slightly separated positions in the Y-direction. Hence, the lower central 5×5 matrix in FIG. 9 is used. Note that in this matrix the coefficient columns having the matrix center as the center are not the same as the coefficient rows. When such filter calculations are done for the entire pixel data array, RGB data corresponding to the right pixel data array shown in FIG. 9 is finally obtained.

Upon completing interpolation of image data for four frames obtained by pixel shift photographing in the image processor 9, image data is temporarily transferred to the work memory 13 in step S264 to compress and save the image data obtained by interpolation. Subsequently, lossy compression is set as the image compression method in the memory controller 10 in step S265.

Note that in lossy compression data exactly the same as that before compression cannot be reconstructed from compressed data. If lossy compression is done using DCT (Discrete Cosine Transform) to transform and quantize image data in the respective blocks into two-dimensional frequency data, the image data volume can be greatly reduced.

Figure 10:
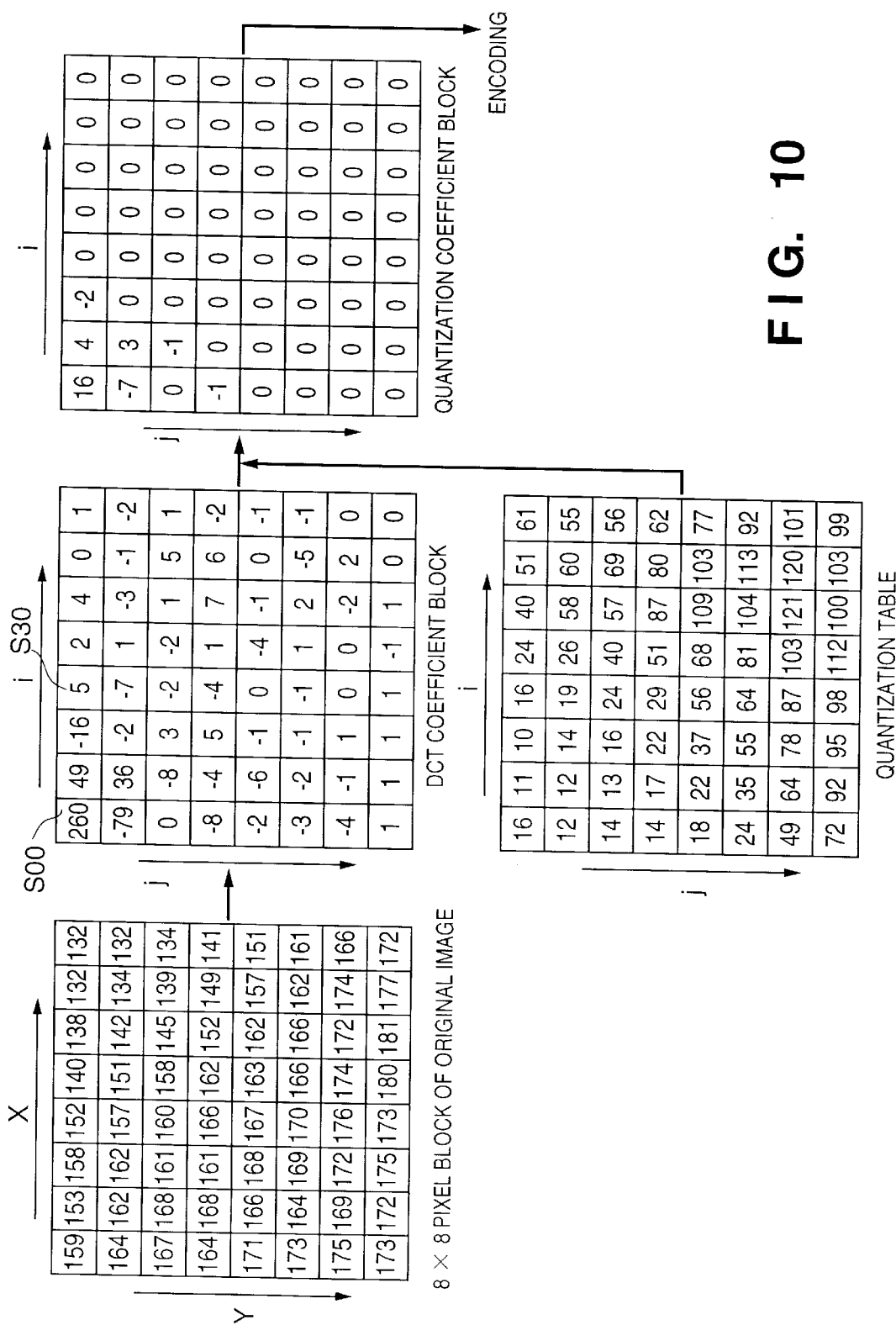
FIG. 10 is a view for explaining lossy compression of a photographed image in the first embodiment.

FIG. 10 illustrates the compression process using DCT. As mentioned above, in JPEG compression or the like using DCT, the entire image is normally divided into 8×8 blocks, and similar transformation is done for each block. The left matrix in FIG. 10 exemplifies this 8×8 pixel block, and the upper central DCT coefficient block in FIG. 10 represents the DCT given below for the respective pixel data:

$$Sij = \frac{1}{4} CiCj \sum_{i=0}^{7} \sum_{j=0}^{7} \left[ (Pxy - 128)\cos\left\{(2x+1)i\frac{\pi}{16}\right\}\cos\left\{(2y+1)j\frac{\pi}{16}\right\} \right] \quad (1)$$

for Ci, Cj=1√2 when i, j=0
Ci, Cj=1 when i, j≠1

The upper left coefficient in the upper central DCT coefficient block in FIG. 10 is the direct current (DC) component contained in the image, and other coefficients are alternate current (AC) components which indicate the levels of high-frequency components contained in the image toward the lower right. The respective coefficients included in the DCT coefficient block are quantized by the lower central quantization table in FIG. 10 to obtain the right quantization coefficient block in FIG. 10. The respective coefficients included in the quantization coefficient block are finally encoded by Huffman coding.

Note that quantization transforms coefficients in the DCT coefficient block into a quotient obtained by dividing it by data at the corresponding position in the quantization table. For example, in the DCT coefficient block, the value of pixel $S_{00}$ at i=j=0 is "260", and the quantization result of this pixel value using data "16" at the corresponding position in the quantization table is "16", which appears at the upper left corner of the quantization coefficient block. On the other hand, the value of pixel $S_{30}$ at i=3 and j=0 is "5", and the quantization result of this pixel value using data "16" at the corresponding position in the quantization table is "0". Hence, by changing the individual data in the quantization table with respect to the DCT coefficient block as the conversion result into frequency data, the value of the coefficient to be encoded can be controlled to decrease, and the number of "0" quantization coefficients can also be controlled, thus arbitrarily setting the image compression level.

Therefore, lossy compression using DCT is executed in units of 8×8 pixel blocks for the interpolated image after pixel shift photographing in step S266, and the lossy-compressed image data blocks are encoded by, e.g., Huffman coding in step S267 as in "photographing storage mode 1" above. The encoded image data blocks are sequentially stored in the external memory 14 in step S268. If it is determined in step S269 that compression of the entire image (all the blocks) and storage of it to the external memory 14 are complete, the processing in "photographing storage mode 2" ends.

In the above description, a high-resolution image obtained by pixel shift photographing is saved in the memory after lossy compression. Application of the compression method that admittedly deteriorates image quality to a high-resolution image may seem contradictory. However, image deterioration due to image compression is negligible unless an extremely high compression rate is set. Hence, by obtaining a high-resolution image by pixel shift photographing and setting a compression rate within an allowable range of image quality deterioration due to compression, high image quality can be maintained.

Note that this embodiment has exemplified a case wherein images for four frames are taken by pixel shift photographing, and are synthesized by interpolation to obtain a single photographed image. Of course, the number of frames to be taken by pixel shift photographing is not limited to such specific example, but can be increased to its upper limit which may occur in consideration of the time required for photographing, the number of available frame memories, the time required for interpolation, and the memory capacity.

As described above, according to this embodiment, since the camera itself automatically determines normal or pixel shift photographing to be done in correspondence with the photographing mode set by the user, pictures with image quality meeting the user's requirement can be taken. Furthermore, since the camera automatically determines an optimal compression method upon saving photographed images in the memory, the user need not determine any compression method and the like. Hence, even a user who is not skilled in digital images can appropriately take a picture using a digital still camera by only selecting the photographing mode.

Second Embodiment

The second embodiment according to the present invention will be described below with reference to the flow charts in FIGS. 11 to 14. Since the arrangement of a digital still camera in the second embodiment is the same as that in FIG. 1, the same reference numerals in the second embodiment denote the same parts as those in the first embodiment, and a detailed description thereof will be omitted.

In the first embodiment described above, the photographing method and the saving method (compression method) of photographed image data are determined in correspondence with the photographing mode set by the user. In the second embodiment, the photographing method and the saving method (compression method) of photographed image data are determined in correspondence with the vibration state upon actual photographing.

Figure 11:
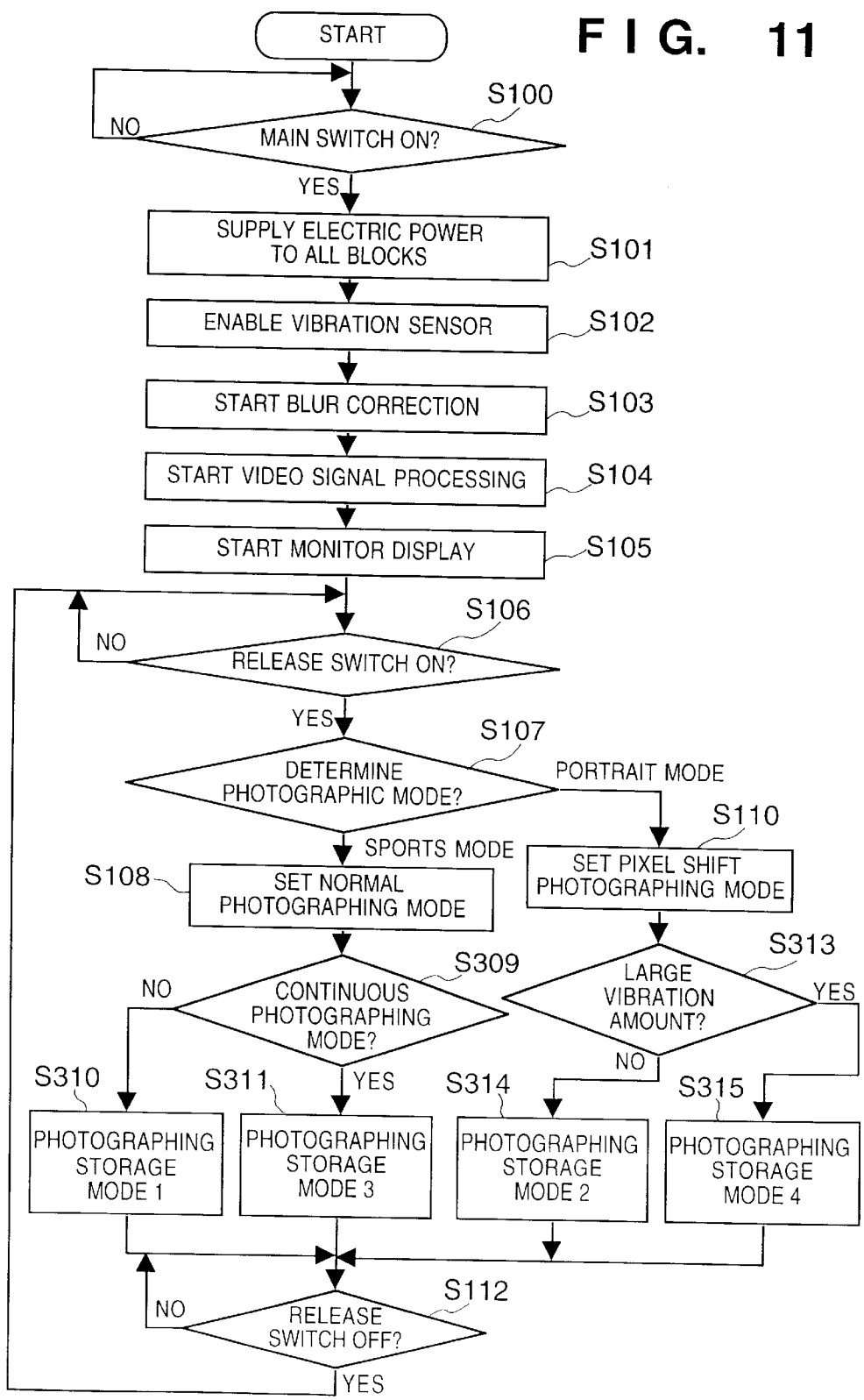
FIG. 11 is a flow chart showing the camera sequence according to the second embodiment of the present invention.

FIG. 11 is a flow chart showing the photographing sequence in the camera of the second embodiment. Note that this photographing sequence is controlled by the overall controller 1 of the camera.

Figure 3:
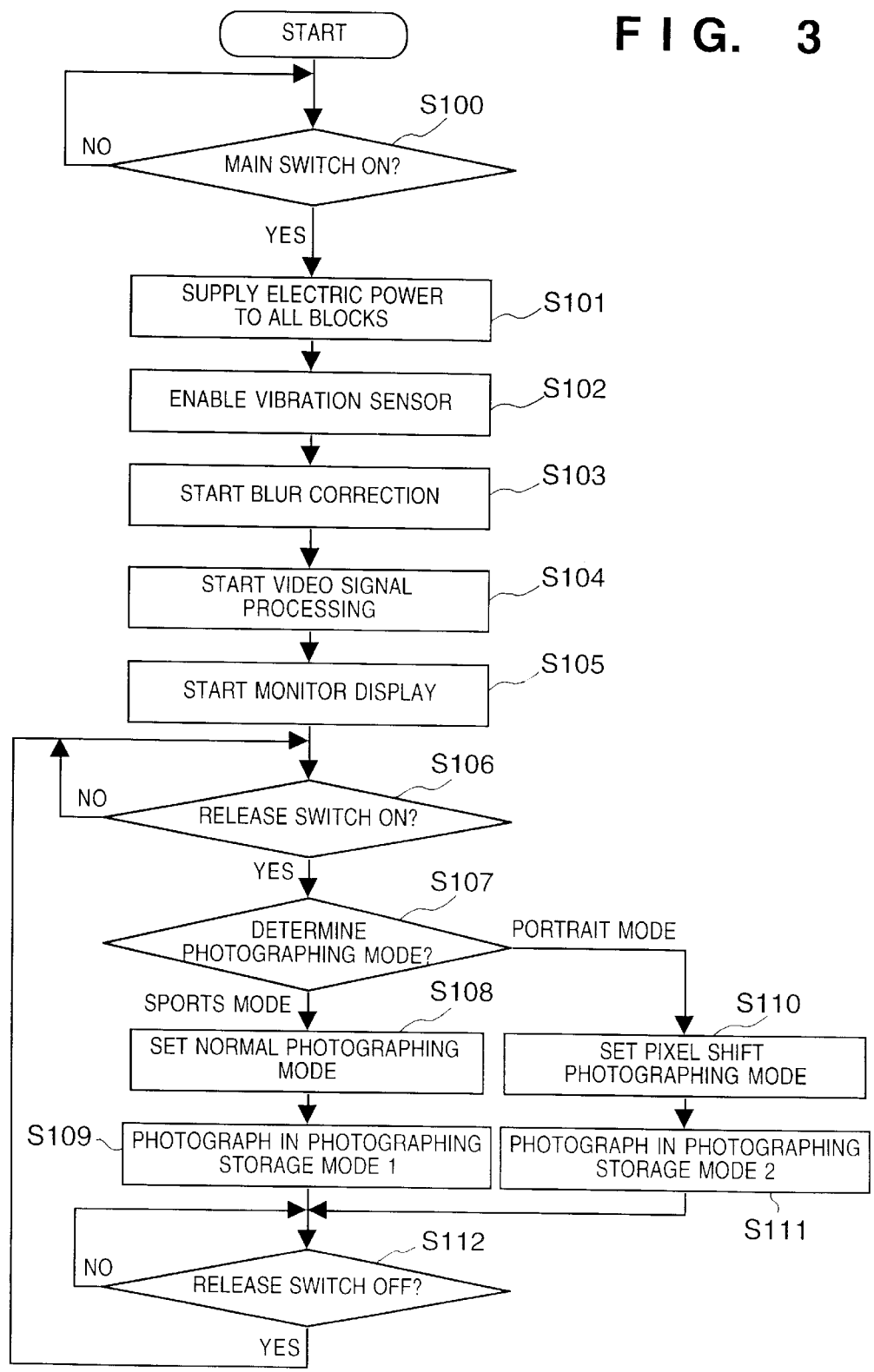
FIG. 3 is a flow chart showing the camera sequence of the first embodiment.

Since photographing preparation and photographing mode setup processes of the camera in steps S100 to S108, S110, and S112 have already been described in the first embodiment with the aid of FIG. 3, a detailed description thereof will be omitted.

If the "normal photographing mode" is set, the flow advances to step S309 to check if a "continuous photographing mode" is set. In the "continuous photographing mode", a plurality of images are continuously taken by single release operation of the camera, and the results are saved in the memory. If it is determined in step S309 that the "continuous photographing mode" is not set, the flow advances to step S310 to actually take a picture in "photographing storage mode 1" and to store photographed data in the frame memory unit 11. The operation in this "photographing storage mode 1" is the same as the processing shown in the flow chart in FIG. 4 in the first embodiment mentioned above, and a detailed description thereof will be omitted. But to reiterate, standard photographing and storage for converting a photographed image into a lossless-compressed file and saving the converted file in the memory are done.

On the other hand, if it is determined in step S309 that the "continuous photographing mode" is set, the flow advances to step S311 to execute "photographing storage mode 3". In this "photographing storage mode 3", only an image of the first frame taken by continuous photographing is lossless-compressed, and images of other frames are lossy-compressed to minimize the data size to be saved upon continuous photographing. This mode will be described in detail later.

If the "pixel shift photographing mode" is set, it is checked in step S313 if the current vibration amount is large. The vibration amount is determined by referring to the output from the vibration sensor 17 or detecting vibration produced on the imaging plane on the basis of image correlation in units of frames in the imaging unit 6. When the vibration amount is determined based on image correlation in units of frames, the vibration amount that remains after vibration correction by the optical unit 4 can be accurately detected. A detailed description of this determination method will be omitted here.

If it is determined in step S313 that the vibration amount is smaller than a predetermined amount, the flow advances to step S314 to execute "photographing storage mode 2". Since "photographing storage mode 2" is the same as that in the first embodiment, a detailed description thereof will be omitted. Briefly stated, a high-resolution image is obtained by a plurality of number of times of pixel shift photographing, and lossy-compressed image data is saved.

On the other hand, if the vibration amount is larger than the predetermined amount, it is improper to use "photographing storage mode 2". This is because since the spatial position of the imaging unit is shifted along with time in pixel shift photographing, image data for a plurality of frames are required. Hence, pixel shift photographing is readily influenced by vibrations since the photographing time is long. More specifically, the shift amount resulting from vibrations becomes larger than that for one or a half pixel by pixel shift, and the spatial array relationship among the individual images obtained by pixel shift photographing cannot be maintained upon interpolation after pixel shift photographing. As a result, the image quality of an image obtained by interpolation deteriorates considerably.

Hence, if the vibration amount is larger than the predetermined amount, the flow advances to step S315 to execute "photographing storage mode 4". In "photographing storage mode 4", even when the "pixel shift photographing mode" is set, since pixel shift cannot improve image quality, standard photographing and storage of image data like in "photographing storage mode 1" are done. This mode will be explained in detail later.

The operations in "photographing storage mode 3" and "photographing storage mode 4" will be explained in detail below.

[Photographing storage Mode 3]

The operation in "photographing storage mode 3" upon setting the "continuous mode" will be explained below with reference to the flow charts in FIGS. 12 and 13.

In step S350, "1" is set in parameter K for selecting the frame memory that temporarily stores the output from the process controller 8, thus designating frame memory 1. In step S351, the control waits for completion of charge accumulation in the imaging unit 6. As has been described in the first embodiment as well, when the imaging unit 6 comprises a CCD or the like, since charges produced by photoelectric conversion are transferred to a transfer unit immediately upon completion of accumulation for a predetermined period of time, the next charge accumulation has been started even while the produced charges are read out in turn.

Hence, the results of the aforementioned process control in units of pixels are sequentially stored in frame memory K (in this case, frame memory 1) in step S352, and if it is detected in step S353 that all pixel data in one frame have been stored in frame memory K, the flow advances to step S354.

It is checked in step S354 if the value of parameter K that designates a frame memory is equal to M, so as to check if photographing has repeated itself M times in the "continuous photographing mode". Of course, the number M of times of photographing is set in advance by the user as the number of pictures to be continuously taken. If the value K has not reached M yet, the flow advances to step S355 to increment K by "1", and the flow returns to step S351 again to check if the next charge accumulation is complete. Upon completion of photographing M times, it is determined in step S354 that the value of parameter K is equal to M, and the flow advances to step S356.

In step S356, "1" is set in parameter K to designate a frame memory. Subsequently, in step S357, the storage contents of frame memory K (frame memory 1 in this case) are transferred to the image processor 9, and are subjected to interpolation, which has been described in the first embodiment. The interpolation result is temporarily transferred to the work memory 13 in step S358. This operation repeats itself for one frame, and if it is detected in step S359 that the processing for one frame is complete, the flow advances to step S360.

In step S360, lossless compression is set in the memory controller 10 as the image compression method. For example, the lossless compression uses DPCM described in "photographing storage mode 1" described in the first embodiment. Since the processing in steps S361 to S364 is the same as that in steps S208 to S211 in FIG. 4 that shows the operation in "photographing storage mode 1", a detailed description thereof will be omitted. With this aforementioned processing, an image of the first frame taken by continuous photographing is lossless-compressed and saved.

Upon completing compression and saving of all blocks of the image of the first frame, the flow advances to step S365 to set "2" in parameter K so as to select the next frame memory. Subsequently, the storage contents of frame memory K (frame memory 2 in this case) are transferred to the image processor 9 in step S366, and the interpolated image is transferred to the work memory 13 in step S367. This operation continues for one frame, and if it is detected in step S368 that the processing for one frame is complete, the flow advances to step S369.

In step S369, lossy compression is set in the memory controller 10 as the image compression method. For example, the lossy compression uses compression using DCT, which has been described in "photographing storage mode 2" in the first embodiment. Hence, DCT and quantization are executed after the photographed image is broken up into, e.g., 8×8 pixel blocks in step S370, and the quantization results are encoded by, e.g., Huffman coding in step S371. Then, the code data are saved in the external memory 14 in step S372. Furthermore, it is checked in step S373 if all blocks have been compressed and saved. If all blocks have not been compressed and saved yet, the flow returns to step S370 to repeat the above operations. Upon completion of compression and storage of all the blocks in the external memory 14, the flow advances to step S374.

It is checked in step S374 if the value of parameter K for selecting a frame memory has reached the number M of times of photographing, so as to check if compression and saving of all photographed images are complete. If compression and saving are not complete yet, the value K is incremented by "1" in step S375, and the flow returns to step S366 to repeat compression and saving of the next image. Hence, upon completion of compression and saving for M frames of images, the operation in "photographing storage mode 3" ends.

As mentioned above, in "photographing storage mode 3", only the image of the first frame taken by continuous photographing is lossless-compressed, and images of other frames are lossy-compressed. That is, data compression and saving dedicated to the continuous photographing mode are done.

[Photographing storage Mode 4]

Figure 14A:
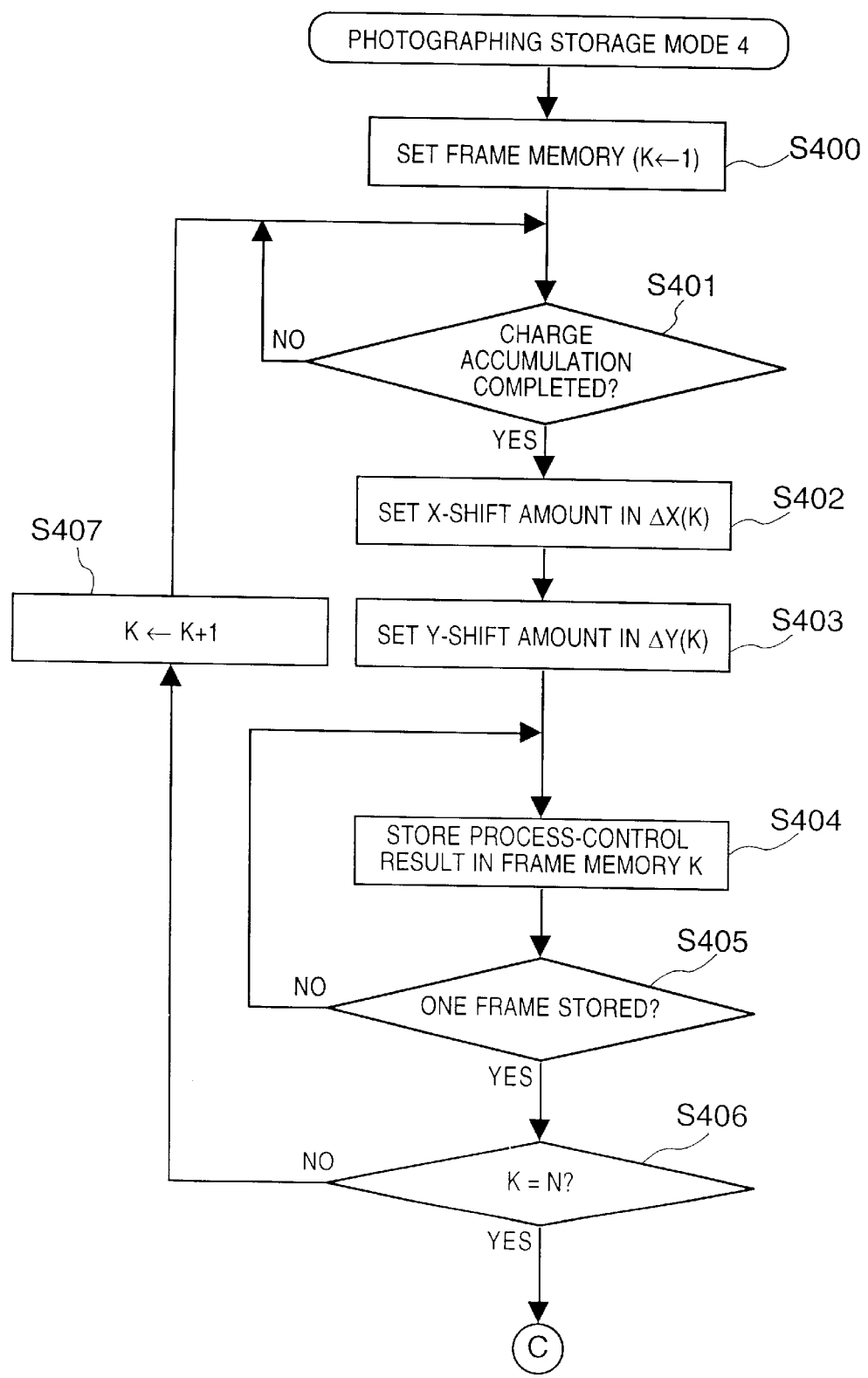
FIGS. 14A and 14B are flow charts showing the operation in photographing storage mode 4 in the second embodiment.
Figure 14B:
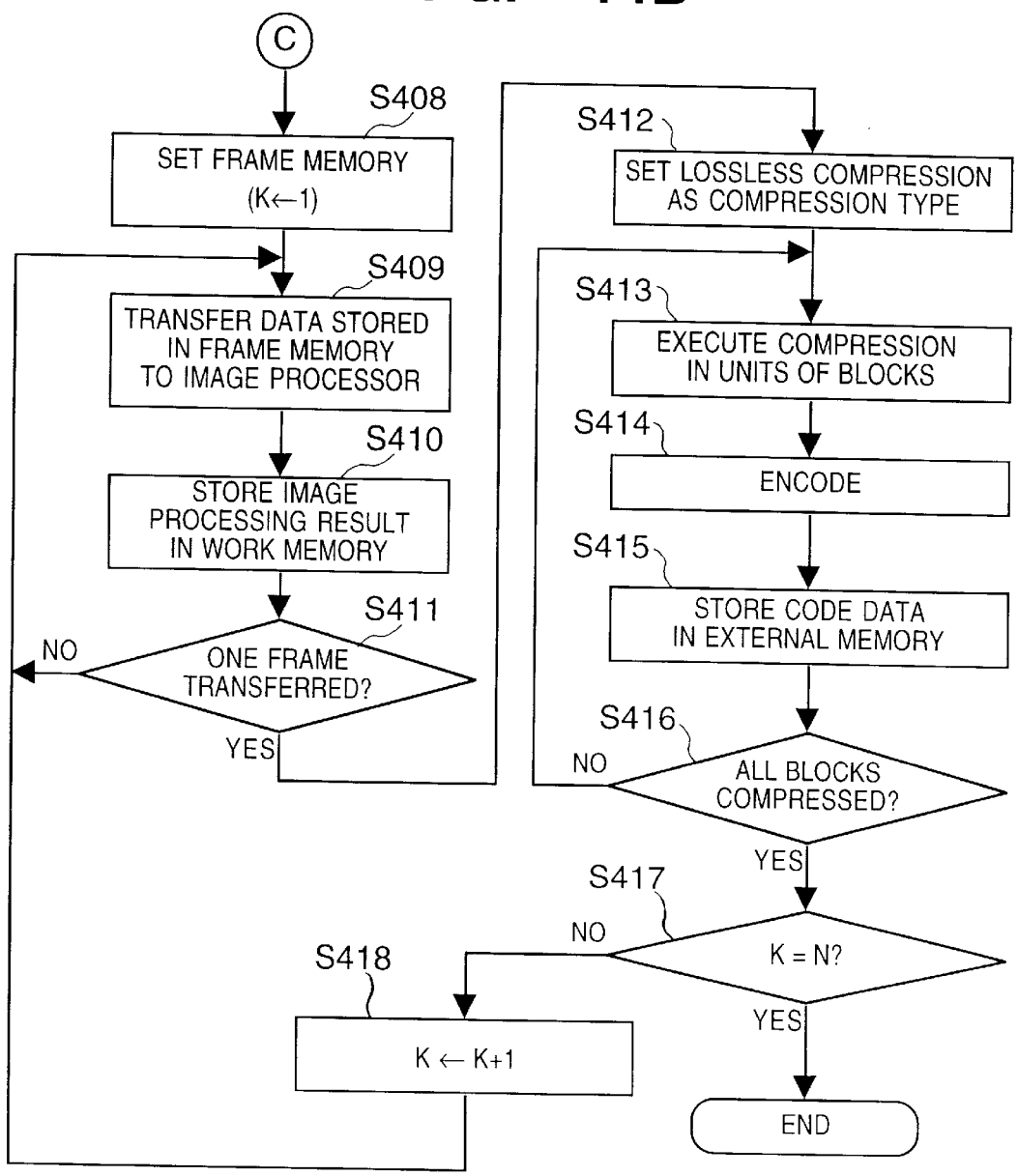

The operation in "photographing storage mode 4" selected when the vibration amount is large will be explained below with reference to the flow charts in FIGS. 14A and 14B.

The operation in steps S400 to S407 takes all images by pixel shift photographing and stores them in the frame memories. Since this operation is the same as that in steps S250 to S257 in the flow charts of FIGS. 5A and 5B that show "photographing storage mode 2" in the first embodiment above, a detailed description thereof will be omitted.

Upon completion of photographing of a predetermined number of images by pixel shift photographing, "1" is set in parameter K for designating a frame memory in step S408. Subsequently, the storage contents of frame memory K (frame memory 1 in this case) are transferred to the image processor 9 and are subjected to the interpolation mentioned above in step S409. The interpolation result is temporarily transferred to the work memory 13 in step S410. This operation continues for one frame, and if it is detected in step S411 that the processing for one frame is complete, the flow advances to step S412.

In step S412, lossless compression is set in the memory controller 10 as the image compression method. For example, the lossless compression uses DPCM described in "photographing storage mode 1" in the first embodiment. Since the processing in steps S413 to S416 is the same as that in steps S208 to S211 in "photographing storage mode 1" shown in FIG. 4, a detailed description thereof will be omitted.

If it is determined in step S416 that compression and saving of all blocks of an image of the first frame are complete, the flow advances to step S417 to check if compression and saving of all images taken by pixel shift photographing are complete. If compression and saving of all images are not yet complete, the flow advances to step S418 to increment the value of parameter K for selecting a frame memory. The flow then returns to step S409 to compress and save the next image. More specifically, N photographed image data taken by pixel shift photographing are lossless-compressed and saved in the external memory 14.

As described above, in the second embodiment, even when the pixel shift photographing mode is automatically selected, if the vibration amount before photographing is large and improvement of image quality cannot be expected by pixel shift photographing, not only interpolation for synthesizing a plurality of images taken by pixel shift photographing is disabled, but also the compression method is switched from lossy compression to lossless compression. That is, in correspondence with the vibration amount, "photographing storage mode 4" for individually lossless-compressing and storing images taken by pixel shift photographing, or "photographing storage mode 2" for lossy-compressing and storing one image obtained by synthesizing images taken by pixel shift photographing is determined.

In the above description, the vibration amount is detected before photographing, but may be detected during photographing. For example, the vibration amount detection step may be inserted among steps S400 to S407 in FIG. 14A.

In the above description, when the detected vibration amount is large, a plurality of images taken by pixel shift photographing are not synthesized even when the pixel shift photographing mode is set. Alternatively, for example, when the vibration amount is large, pixel shift photographing itself may be disabled.

To restate, according to the second embodiment, when the camera shake amount is large upon photographing, even when the pixel shift photographing mode is set, a plurality of images taken by pixel shift photographing are individually saved without being synthesized, and the compression method upon saving is also automatically switched from lossy compression to lossless compression, thus minimizing deterioration of image quality arising from camera shake.

Third Embodiment

The third embodiment according to the present invention will be described below with reference to the flow charts in FIGS. 15A, 15B, and 16. Since the arrangement of a digital still camera in the third embodiment is the same as that in FIG. 1, the same reference numerals in the third embodiment denote the same as those in FIG. 1, and a detailed description thereof will be omitted.

In the first and second embodiments above, the photographing method and image data saving method, i.e., compression method, are determined in correspondence with the photographing mode and vibration amount. In the third embodiment, the photographing method and image data saving method (compression method) are determined in correspondence with the free space of the storage capacity of the external memory 14 that stores image data.

Figure 15A:
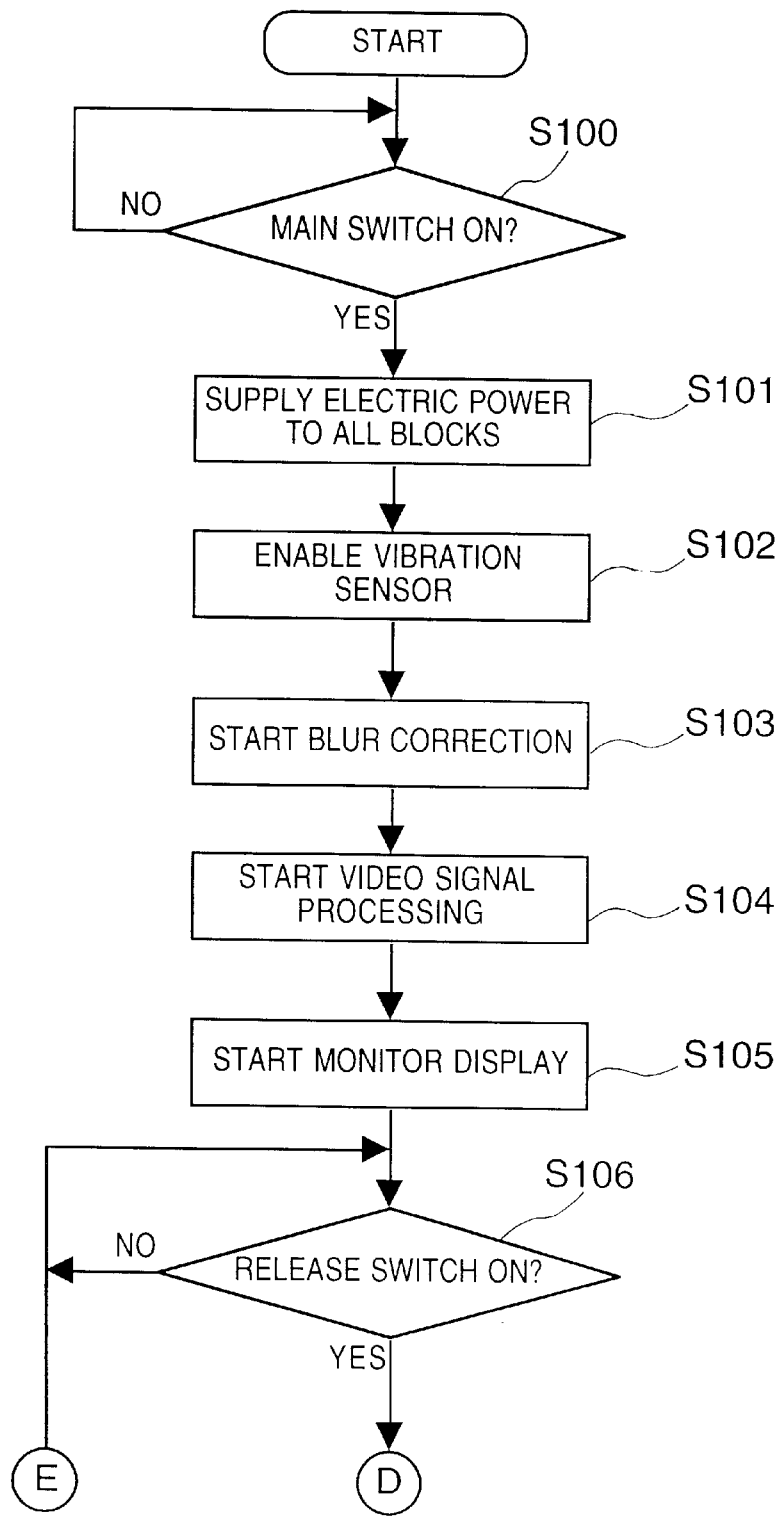
FIGS. 15A and 15B are flow charts showing the camera sequence according to the third embodiment of the present invention.
Figure 15B:
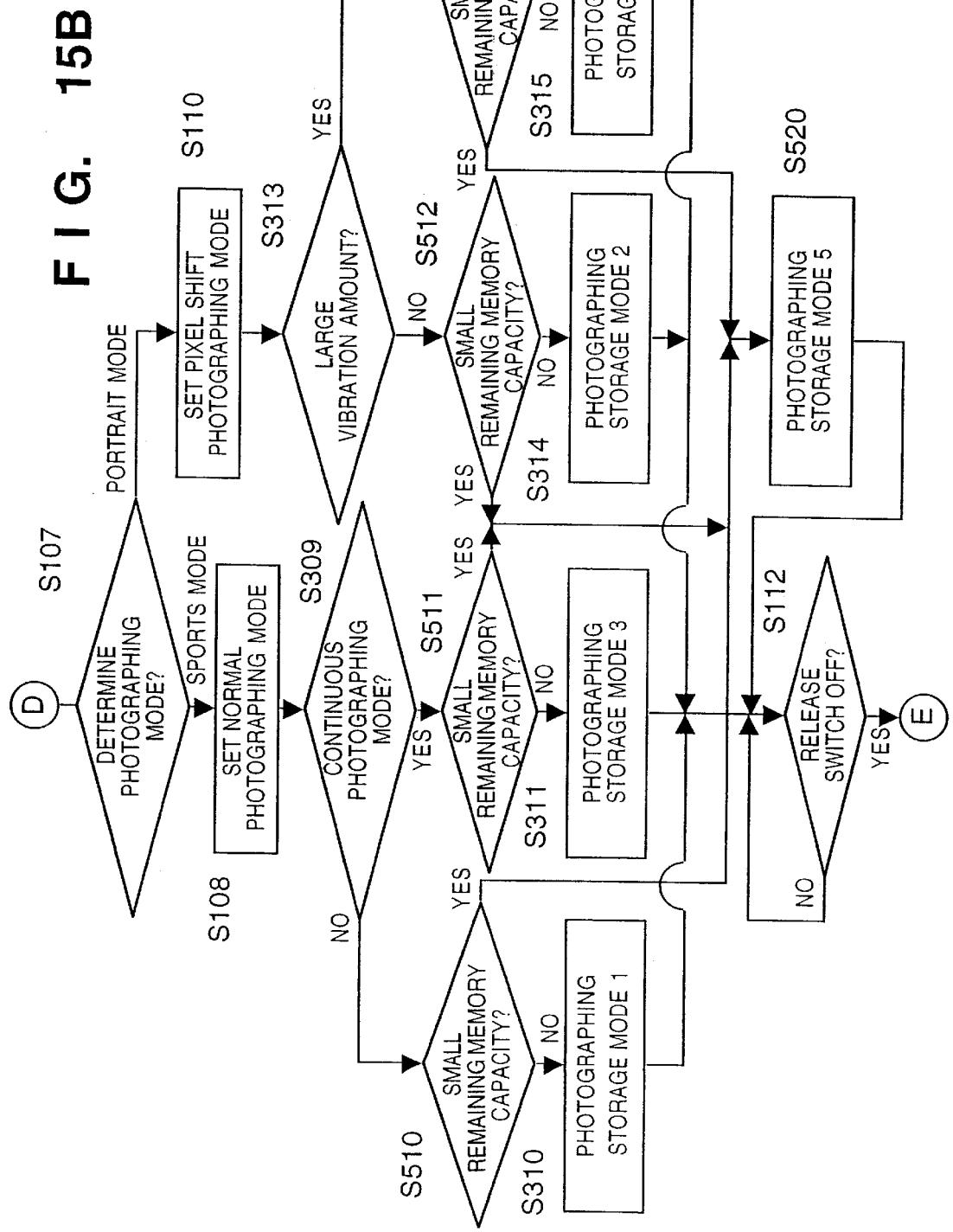

FIGS. 15A and 15B are flow charts showing the photographing sequence in the camera of the third embodiment. This photographing sequence is controlled by the overall controller 1 in the camera. Note that the photographing sequence shown in FIGS. 15A and 15B is substantially the same as that in the second embodiment shown in FIG. 11, except that steps S510 to S513 of checking the free space of the external memory 14, and step S520 of executing "photographing storage mode 5" are added. Hence, since the operation and processing in other steps shown in FIGS. 15A and 15B have already been described above with the aid of FIG. 11, a detailed description thereof will be omitted.

In the third embodiment, the flow advances to one of steps S510 to S513 in correspondence with the photographing mode set to check if the remaining storage capacity of the external memory 14 is sufficient.

Figure 17:
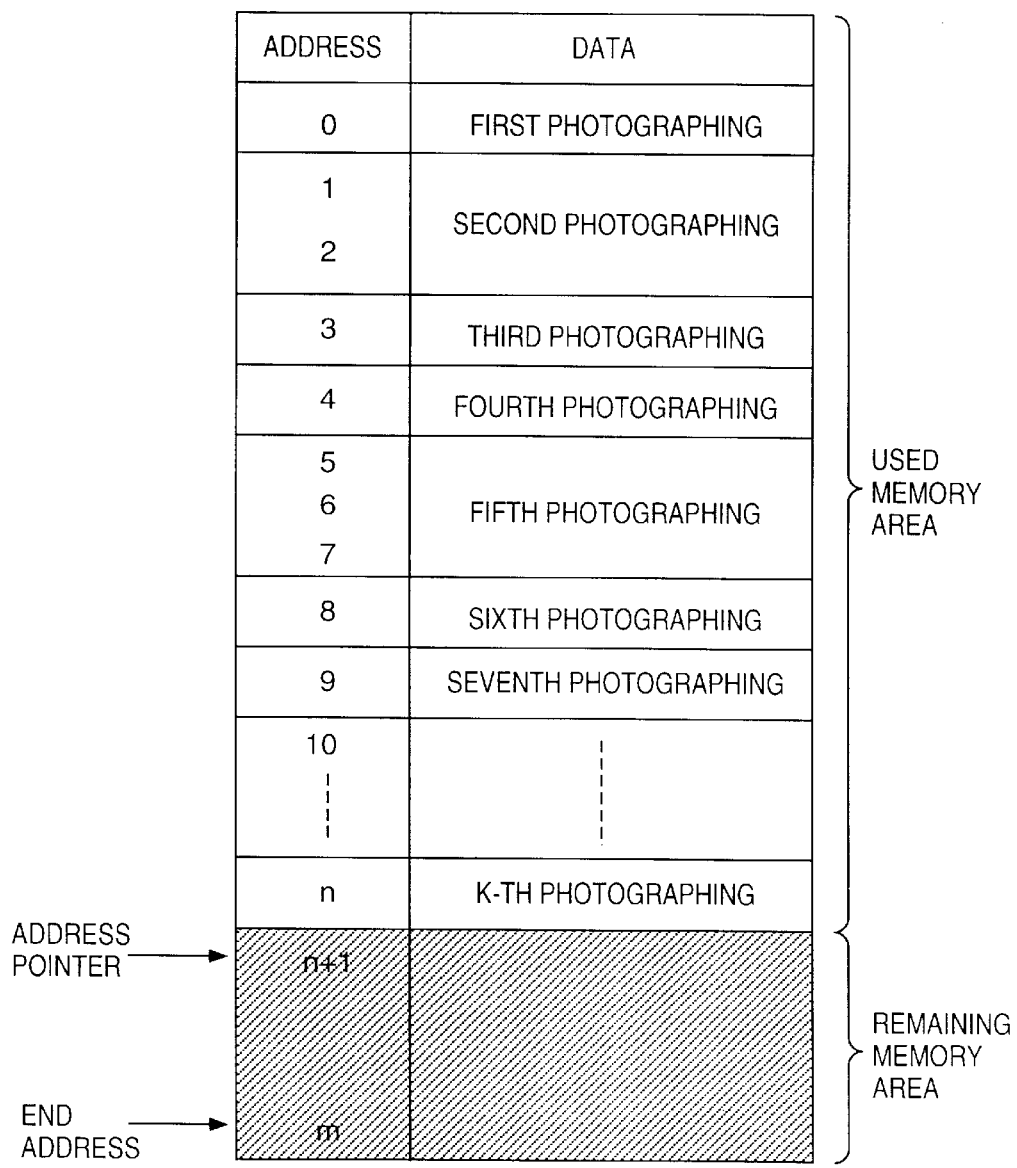
FIG. 17 is a table for explaining how a memory is used in the third embodiment.
Figure 18:
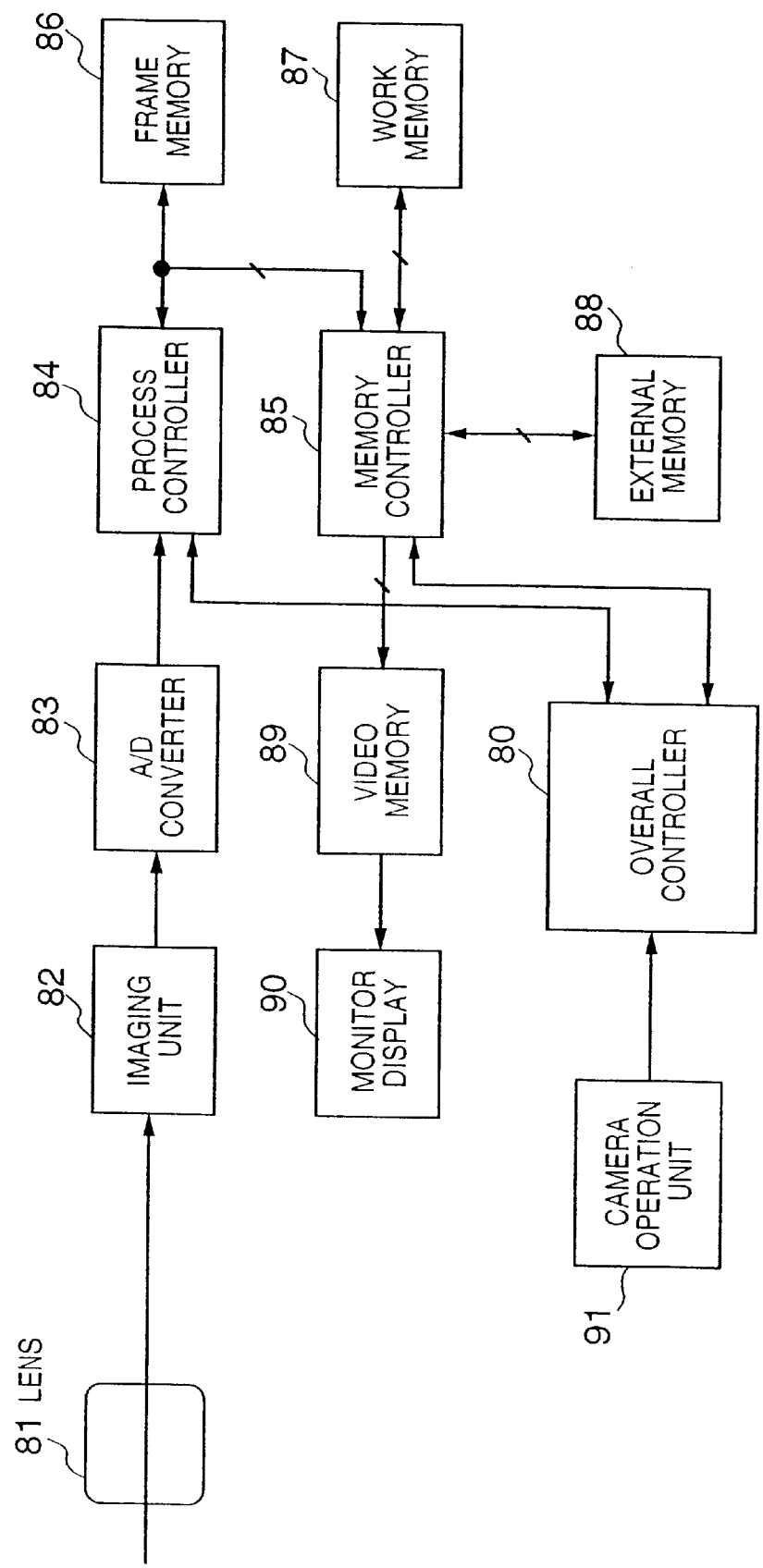
FIG. 18 is a block diagram showing the arrangement of a digital still camera.

A method of checking if the remaining storage capacity of the external memory 14 is sufficient will be explained below with reference to FIG. 17. FIG. 17 shows the use state of the memory when photographed images are stored in the external memory 14. After the external memory 14 is initialized, image data are stored in turn from lower addresses, i.e., image data taken by the first photographing is saved at address 0, image data taken by the second photographing is saved at address 1, and so forth. In this case, since the image data size varies in units of shots, the address value does not always match the image photographing number. However, the remaining memory capacity can be detected on the basis of end address m of the memory itself and the current address n+1 indicated by an address pointer. Note that the threshold values must be set in units of photographing modes in advance to check if the obtained remaining capacity is sufficient in the subsequent processing. Of course, the threshold values may be changed by the user.

If the remaining capacity of the external memory 14 is sufficient, photographing and storage of image data are done in the corresponding photographing storage mode.

On the other hand, if the remaining capacity of the external memory 14 is insufficient, the flow advances to step S520 to execute "photographing storage mode 5". As will be described in detail later, in this "photographing storage mode 5", the number of frames to be taken is limited to one (to be referred to "one-shot photographing" hereinafter), that photographed image is compressed at a high compression rate, and the compressed data is stored in the external memory 14 so as to store a photographed image even when the remaining memory capacity is small.

As described above, in the third embodiment, when the remaining capacity of the external memory 14 that stores photographed image data is insufficient for the set photographing storage mode, "photographing storage mode 5" for making one-shot photographing irrespective of the set photographing storage mode, and compressing a photographed image at a high compression rate is executed. The operation in "photographing storage mode 5" will be described in detail below with reference to the flow chart in FIG. 16.

Figure 16:
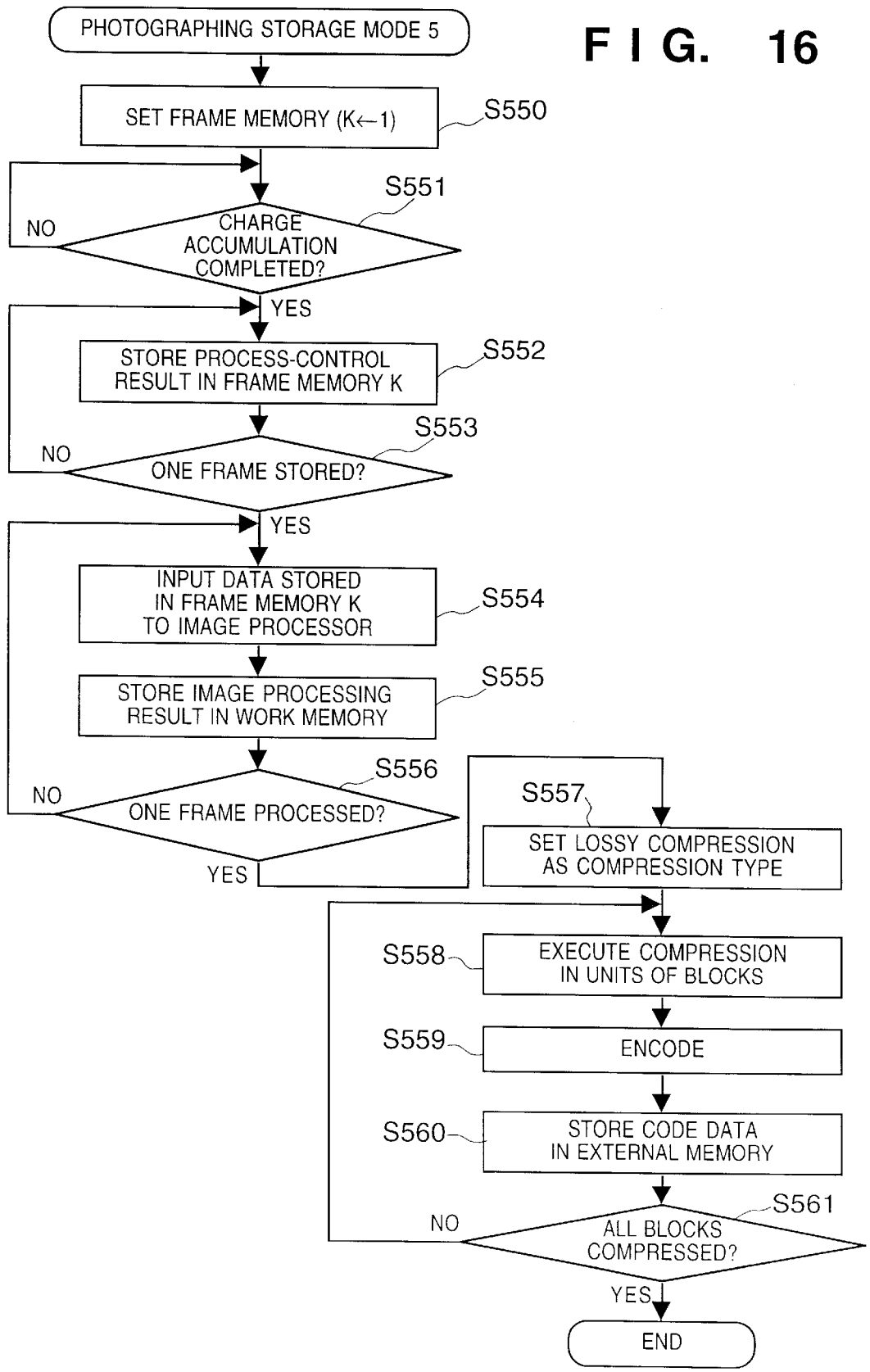
FIG. 16 is a flow chart showing the operation in photographing storage mode 5 in the third embodiment.

Referring to FIG. 16, since the operation in steps S550 to S556 is the same as that in steps S200 to S206 in "photographing storage mode 1" shown in FIG. 4, a detailed description thereof will be omitted.

In step S557, lossy compression is set in the memory controller 10 as the image compression method. For example, the lossy compression uses the DCT described in "photographing storage mode 2" of the first embodiment to compress data using a quantization table, which can obtain a sufficiently high compression rate. Since steps S558 to S561 are the same as steps S265 to S269 in FIGS. 5A and 5B, a detailed description thereof will be omitted.

In this way, in "photographing storage mode 5", since the remaining capacity of the external memory 14 is small, one-shot photographing is done forcibly, and image data is compressed and saved by lossy compression with a high compression rate. When "photographing storage mode 5" is or was executed, a message indicating the small remaining capacity of the external memory 14 and/or a message indicating that "photographing storage mode 5" is or was executed are/is preferably displayed on the camera operation unit 18 and/or monitor display 16 to call for user's attention.

As described above, according to the third embodiment, when the remaining capacity of the external memory 14 is small, one-shot photographing and compression with a high compression rate are forcibly done irrespective of the current camera photographing mode so as to reduce the image data volume to be stored. Hence, even when the remaining capacity of the external memory 14 becomes small, photographing can be done by fully using that remaining capacity.

According to the embodiments described above, the following effects can be obtained:

(1) Since the photographing method and saving method (compression method) of photographed image data are automatically switched in accordance with the photographing mode corresponding to an object, which is set in the imaging apparatus, an optimal photographing method and saving method of the photographed image can be automatically selected in correspondence with the object without requiring any troublesome operation.

(2) Since the photographing method and saving method (compression method) of photographed image data are automatically switched in accordance with the state (camera shake or the like) upon photographing of the imaging apparatus, the influence of camera shake or the like on the photographed image can be minimized.

(3) Since the photographing method and saving method (compression method) of the photographed image data are automatically switched in accordance with the remaining capacity of the memory that saves the photographed image, photographing can be done by fully using the limited remaining capacity.

To recapitulate, since the imaging apparatus automatically determines an appropriate photographing method and saving method (compression method) of photographed image data, even a user who is not skilled in operations of the digital still camera can easily and appropriately take a picture by only setting a photographing mode corresponding to an object of interest.

In the above embodiments, DPCM is used as lossless compression. For example, the Lempel-Ziv scheme may be used instead. Similarly, a compression method such as JPEG that uses DCT has been exemplified as lossy compression. Alternatively, a compression method using wavelet transform may be used. That is, a combination of a compression method that can completely reconstruct image data before compression even if the compression rate is low, and a compression method which can assure a high compression rate even if it cannot completely reconstruct image data before compression need only be used, and the compression rate of the compression method with a high compression rate is preferably controllable.

Fourth Embodiment

[Arrangement]

Figure 19:
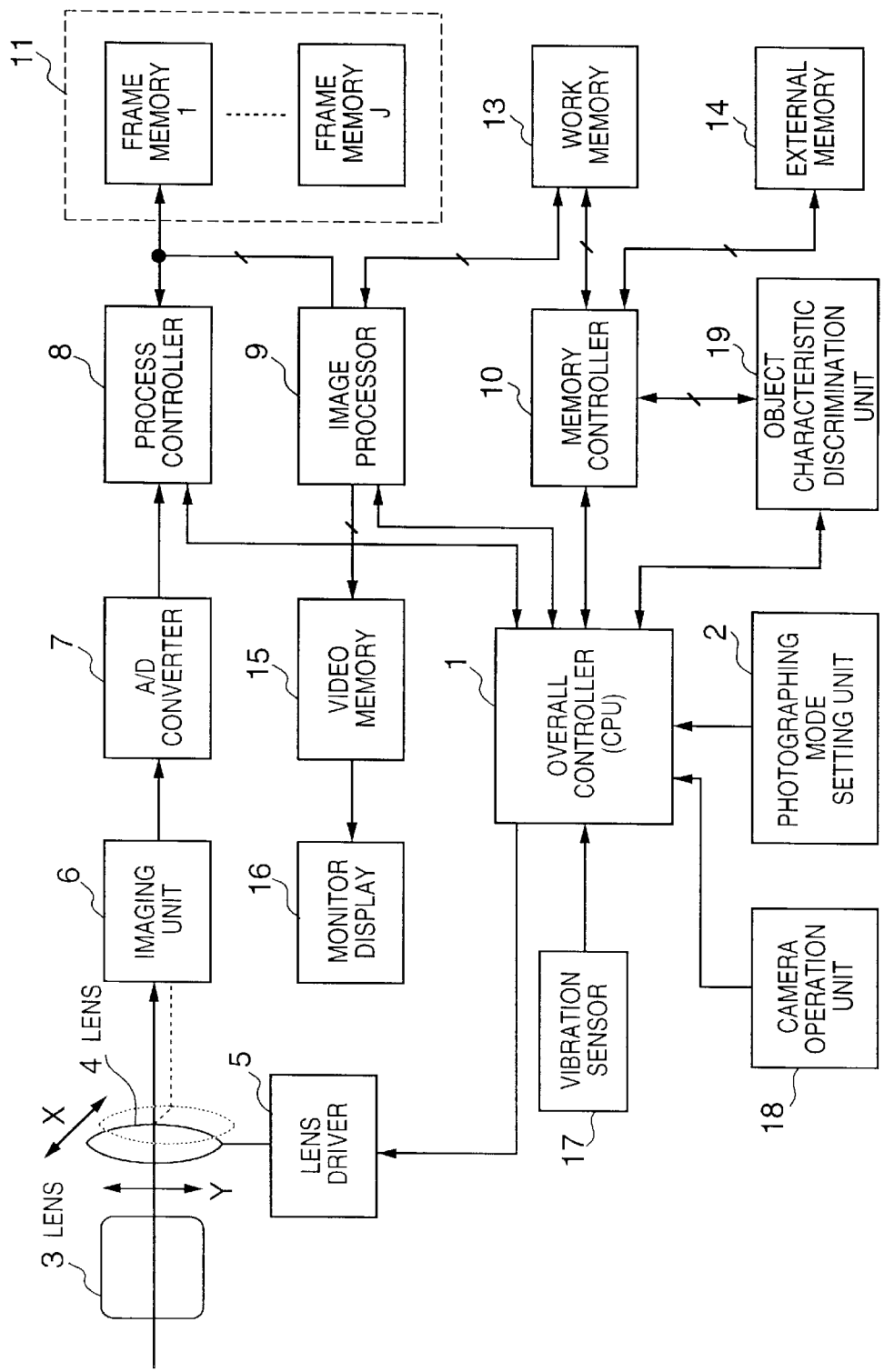
FIG. 19 is a block diagram showing an example of the arrangement of a digital camera according to the fourth embodiment of the present invention.

FIG. 19 is a block diagram showing an example of the arrangement of a digital camera according to the fourth embodiment of the present invention. Since the arrangement of the fourth embodiment is substantially the same as that in the first embodiment shown in FIG. 1, except for an object characteristic discrimination unit 19, the same reference numerals in FIG. 19 denote the same parts as those in FIG. 1, and a detailed description thereof will be omitted.

The object characteristic discrimination unit 19 discriminates the state of an object on the basis of an image stored in the work memory 13, and determines the pixel shift photographing method in correspondence with the discrimination result.

[Photographing Operation]

The photographing operation of the digital camera according to the fourth embodiment will be described below with reference to the flow chart in FIG. 20. In this flow chart, since the processing in steps S100 to S106 and step S112 is the same as that in FIG. 3, a detailed description thereof will be omitted.

Normal photographing is done in step S1107 to discriminate the state of the object to be photographed, and the object characteristic discrimination unit 19 discriminates the state of the object on the basis of the photographed image in step S1108. In step S1109, pixel shift photographing is done on the basis of the discriminated state of the object. Note that the operation of normal photographing in step S1107 is the same as that in steps S200 to S206 in the flow chart shown in FIG. 4, i.e., an image for one frame is photographed and is stored in the frame memory.

[Object Characteristic Discrimination]

Figure 21A:
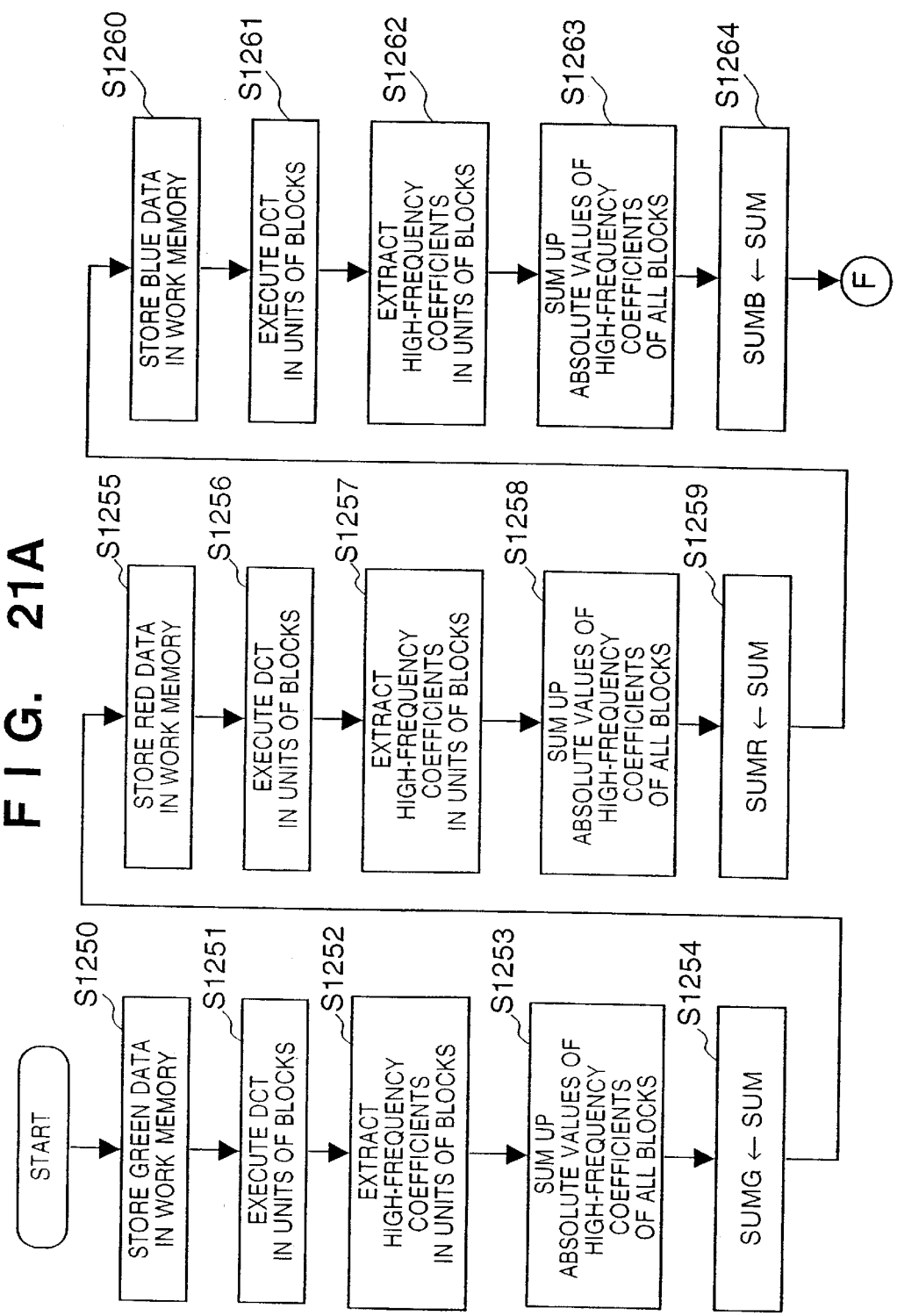
FIGS. 21A and 21B are flow charts for explaining object characteristic discrimination.
Figure 21B:
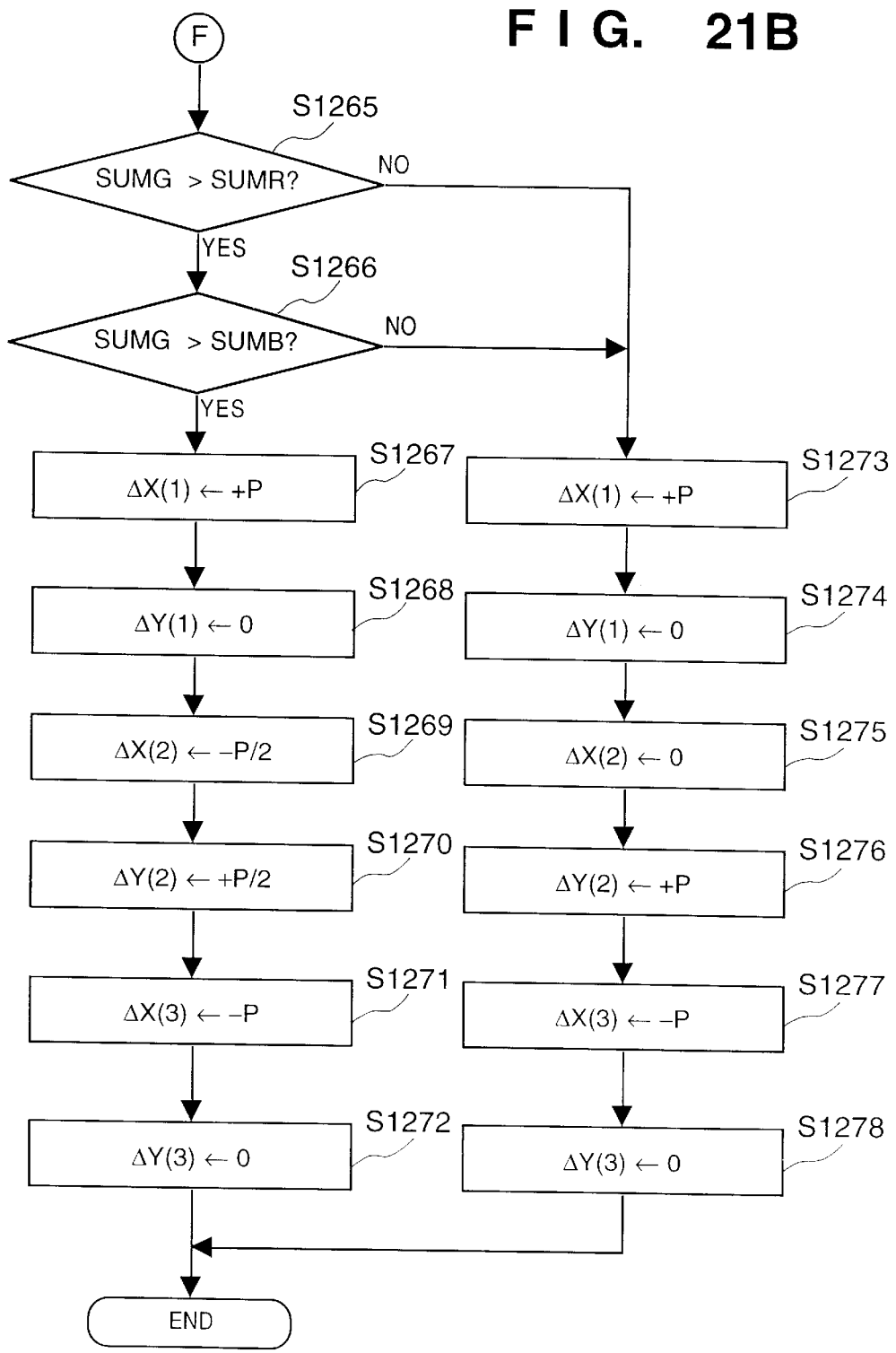

The object characteristic discrimination method will be explained below with reference to the flow charts in FIGS. 21A and 21B.

In step S1250, green data of image data taken by normal photographing is transferred to the work memory 13. In order to detect frequency components contained in this green data, the green data for one frame is segmented into 8×8 pixel blocks and is converted into two-dimensional frequency data by DCT in units of blocks in step S1251. Note that the present invention is not limited to DCT as long as green data can be converted into two-dimensional frequency data. For example, other orthogonal transforms may be used or wavelet transform may be used.

The frequency components of the green data are calculated in units of blocks in step S1252, and it is checked in step S1253 how many components equal to or higher than a predetermined frequency are contained. For example, the total of the absolute values of DCT coefficients with $i \geq 4$ and $j \geq 4$ in an 8×8 pixel block shown in FIG. 10 is calculated, and the totals of the absolute values of DCT coefficients calculated in units of blocks are summed up, thus easily detecting the ratio of high-frequency components contained in the photographed image.

On the other hand, the total of the absolute values of DCT coefficients with $i \geq 4$ and $j=1$, and the total of the absolute values of DCT coefficients with $i=1$ and $j \geq 4$ are calculated, and the calculated totals of all blocks are summed up, thus also easily detecting the ratio of high-frequency components contained in the photographed image.

The sum is stored in an internal register SUMG of the CPU 1 in step S1254, and frequency analysis of red data contained in the photographed image is started in step S1255. DCT coefficients are calculated in units of blocks in step S1256, and the totals of the absolute value of DCT coefficients equal to or higher than the predetermined frequency are calculated in units of blocks as in the green data in step S1257. The sum total of the absolute values of DCT coefficients of all blocks is calculated in step S1258, and is stored in a register SUMR in step S1259.

In case of red data, as can be seen from the color filter array on the imaging element shown in FIG. 2, since the number of pixels is smaller than that of green data, red data of the respective pixels are calculated by interpolation using surrounding pixels, and high-frequency components attenuate accordingly due to the low-pass filter effect. Hence, in case of red data, the sum total of the absolute values of high-frequency components of all blocks calculated by the same method as the green data is multiplied by a predetermined coefficient (>1), and the product is stored in the register SUMR, in place of detecting high-frequency components contained in the photographed image by the same method as green data.

As another method, high-frequency component information obtained from the red data can also be corrected by calculating the total of the absolute values of DCT coefficients within a frequency-component range broader than that of the green data, e.g., within the range $i \geq 3$ and $j \geq 3$.

As for blue data, the same processing as that for the red data is executed in steps S1260 to S1264, and the result is stored in a register SUMB.

[Determination of Pixel Shift Method]

In step S1265 and the subsequent steps, the three pieces of high-frequency component information of the green, red, and blue data stored in the registers SUMG, SUMR, and SUMB are compared to detect a color component that contains a largest number of high-frequency components, and a pixel shift method optimal to that color component is determined. In the following description, the high-frequency component information of the green, red, and blue data stored in the registers SUMG, SUMR, and SUMB may often be called by the same name as the register.

SUMG and SUMR are compared in step S1265, and SUMG and SUMB are compared in step S1266. As a result, if SUMG is larger than SUMR and SUMB, i.e., SUMG is largest, a largest number of high-frequency components are contained in the green data of the photographed image. In this case, the drive amount of the optical unit 4 upon pixel shift photographing is determined by the processing in steps S1267 to S1272.

A drive amount +P for moving the optical unit 4 by an amount corresponding to a pixel pitch P of the imaging unit 6 is set in ΔX(1) in step S1267, ΔY(1)=0 in step S1268, ΔX(2)=−P/2 in step S1269, ΔY(2)=+P/2 in step S1270, ΔX(3)=−P in step S1271, and ΔY(3)=0 in step S1272. Note that the actual drive amount of the optical unit 4 and the moving amount of an image on the imaging plane have a predetermined relationship, but the following explanation will be given assuming that the drive amount and moving amount are equal to each other, for the sake of simplicity.

On the other hand, if it is determined in step S1265 or S1266 that SUMG is smaller than SUMR or SUMB, the red or blue data in the photographed image contains a largest number of high-frequency components. In this case, the drive amount of the optical unit 4 upon pixel shift photographing is determined in steps S1273 to S1278. For example, ΔX(1)=+P is set in step S1273, ΔY(1)=0 in step S1274, ΔX(2)=0 in step S1275, ΔY(2)=+P in step S1276, ΔX(3)=−P in step S1277, and ΔY(3)=0 in step S1278.

In this manner, the pixel shift amounts ΔX(1), ΔY(1), ΔX(2), ΔY(2), ΔX(3), and ΔY(3) are uniquely set on the basis of the comparison result of the high-frequency components of the green, red, and blue data, thus ending object characteristic discrimination.

[Pixel Shift Photographing]

Figure 20:
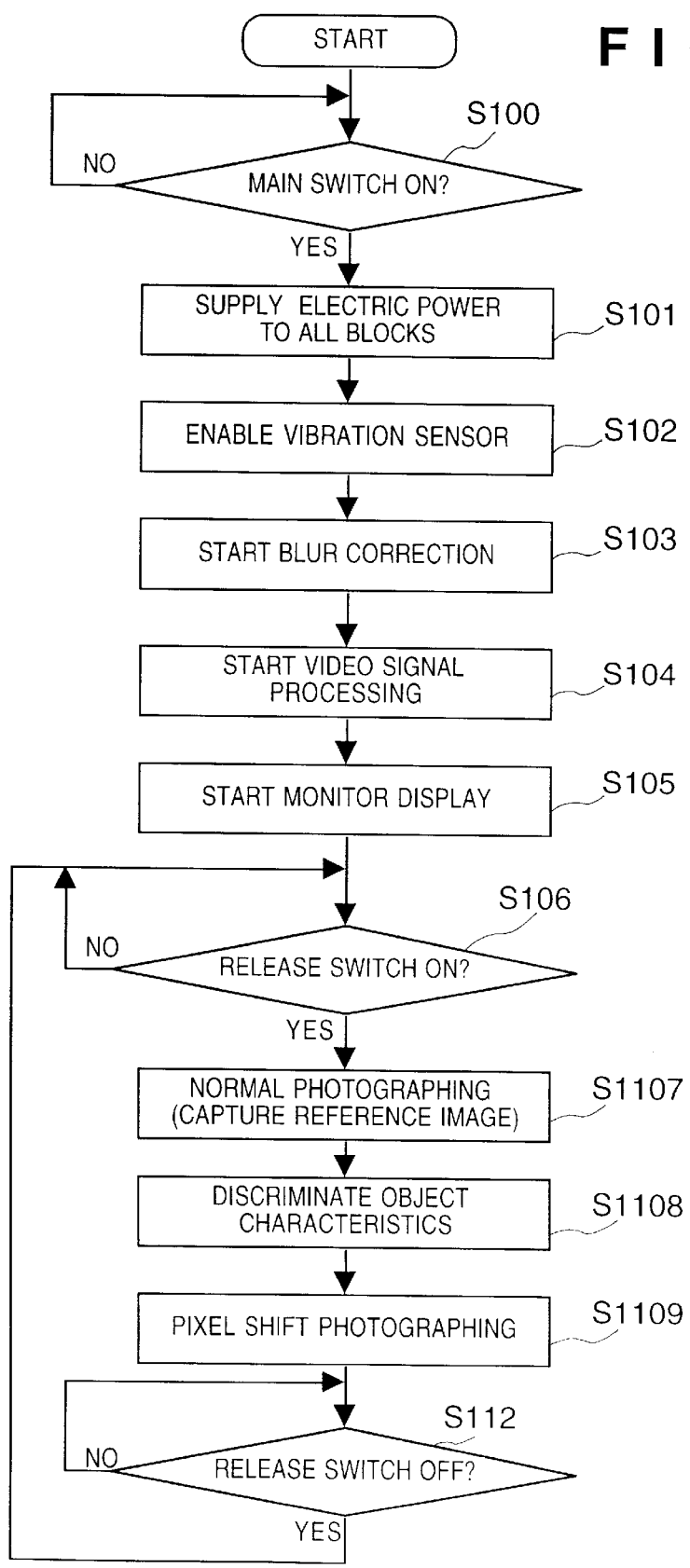
FIG. 20 is a flow chart showing the photographing operation.

Upon completion of the object characteristic discrimination, pixel shift photographing is started in step S1109 in FIG. 20.

In case of the pixel shift method shown in FIG. 7, the resolution of green pixels lined up at pitch P in both the X- and Y-directions is doubled in both the X- and Y-directions, and the resolution of red and blue pixels lined up at pitch 2P in both the X- and Y-directions can be remarkably improved in the X-direction but is not so improved in the Y-direction. Therefore, the pixel shift method shown in FIG. 7 is used when it is discriminated in object characteristic discrimination that the number of high-frequency components of the green data is largest. On the other hand, if it is determined as a result of object characteristic discrimination that the high-frequency components of the red or blue data are more than those of the green data, pixel shift photographing is done by a pixel shift method shown in FIG. 22.

Figure 22:
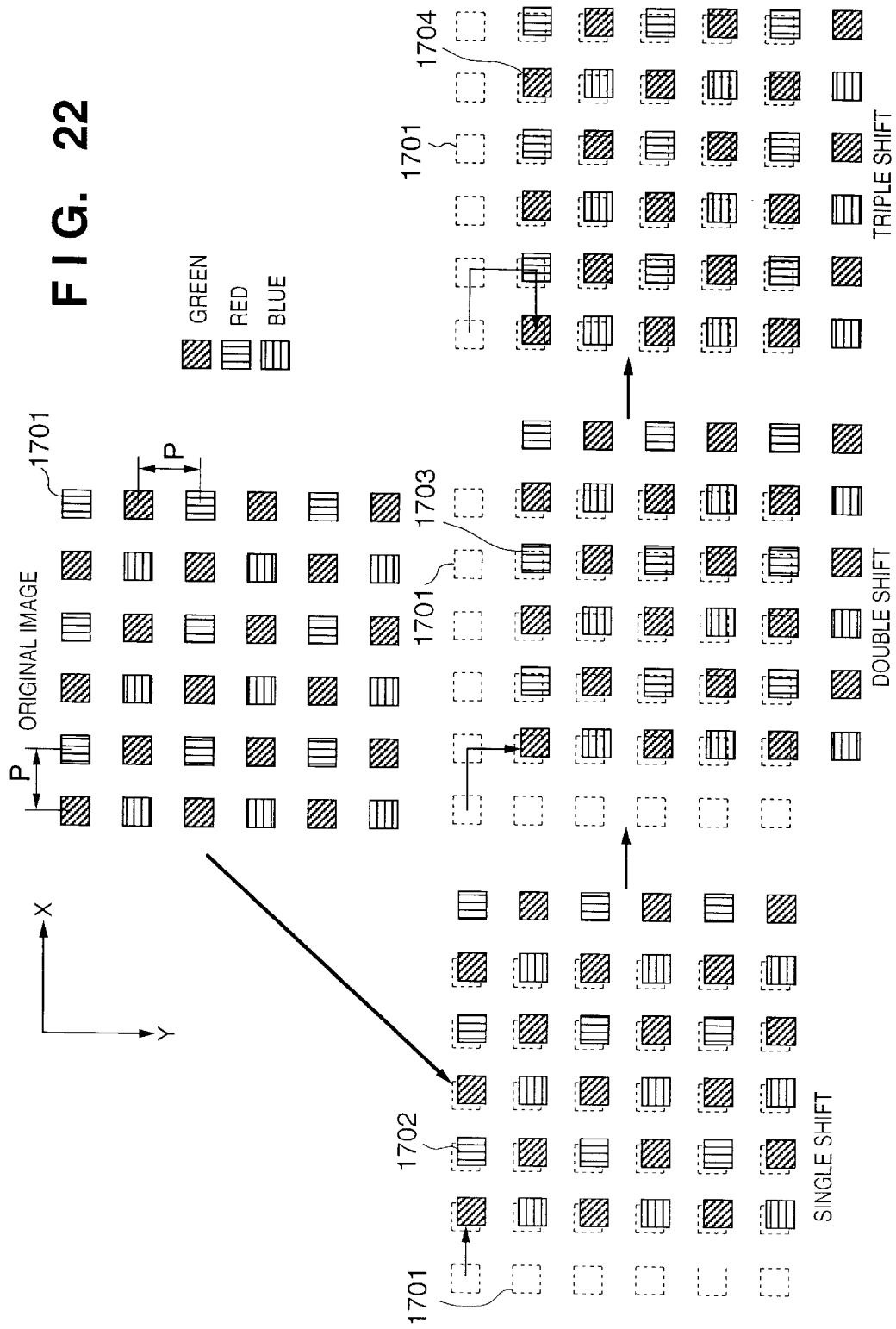
FIG. 22 is a view for explaining a pixel shift method different from FIG. 7.

Referring to FIG. 22, by decentering the optical unit 4 by a predetermined amount in the X-direction, the first shift image 1702, which has been shifted by one pixel pitch P from an initial image 1701 in the X-direction, is obtained. Furthermore, by decentering the optical unit 4 in the first shift state by a predetermined amount in the Y-direction, the second shift image 1703, which has been shifted by p from the first shift image 1702 in the Y-direction, is obtained. Moreover, by decentering the optical unit 4 in the second shift state by a predetermined amount in the X-direction, the third shift image 1704, which has been shifted by −P from the second shift image 1703 in the X-direction, is obtained.

Figure 23:
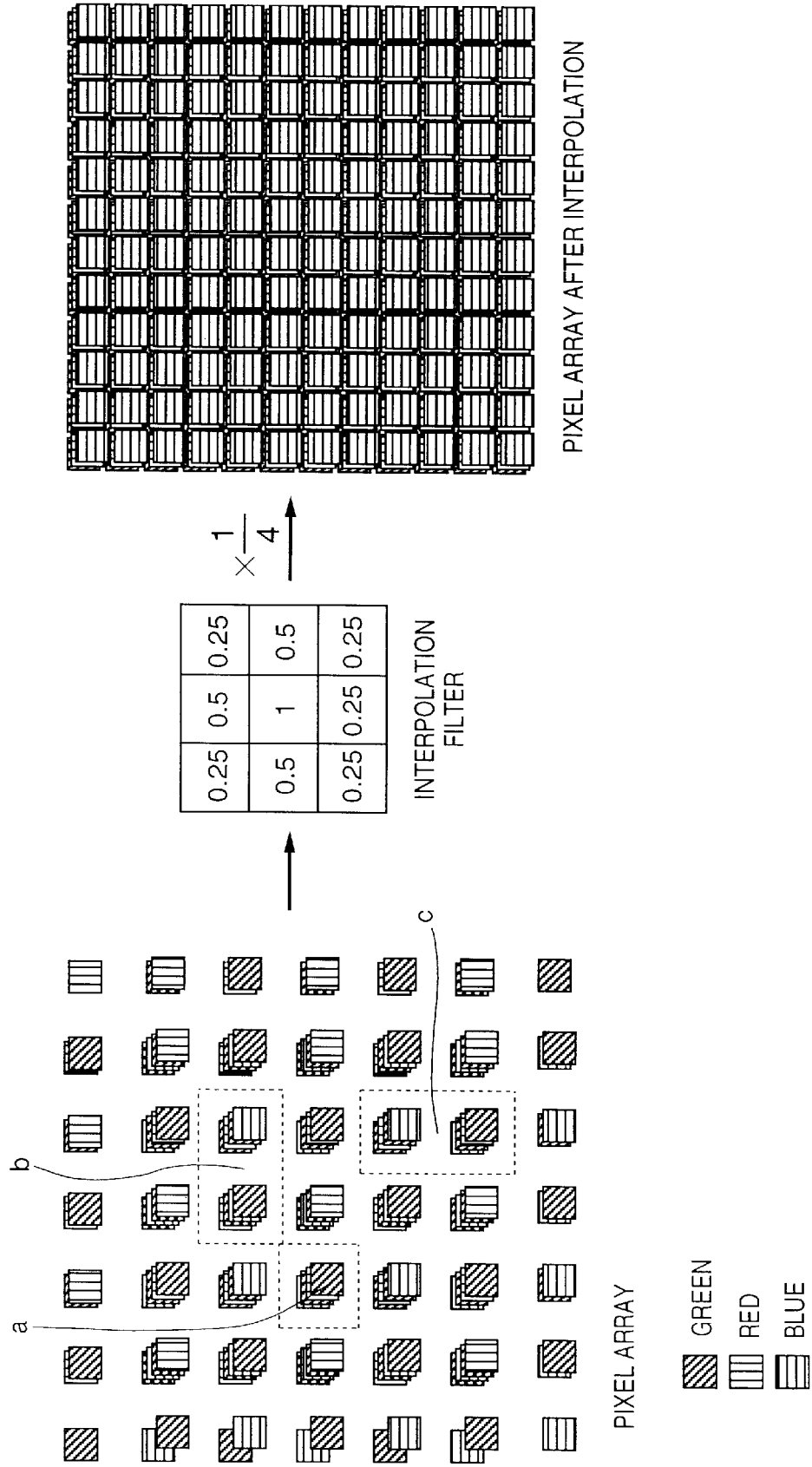
FIG. 23 is a view for explaining the interpolation process corresponding to the pixel shift method shown in FIG. 22.

In this way, by combining a total of four images, i.e., the initial image 1701 and three images shifted by predetermined pixel pitches from the initial image 1701 in units of frames, red and blue pixels can be evenly distributed in the X- and Y-directions, as shown in FIG. 23.

The left matrix in FIG. 23 indicates a pixel data array obtained after pixel shift photographing. In FIG. 23, since green pixel data overlap each other at identical positions as compared to the pixel array of the imaging element with the Bayer pattern shown in FIG. 2, the resolution of the green data is not largely improved compared to the pixel shift photographing shown in FIG. 9.

In order to obtain RGB data of the respective pixels shown in the right matrix in FIG. 23 from the pixel data shown in the left matrix in FIG. 23, a central interpolation filter in FIG. 23 is used. However, since green pixel data overlap each other at identical positions, these data must be averaged in advance.

For example, RGB data corresponding to pixel a shown in FIG. 23 are obtained by multiplying data of pixel a and its eight surrounding pixels within the range bounded by the dotted line by coefficients of the interpolation filter. However, since no pixel data are present around pixel a, RGB data corresponding to pixel data are obtained by multiplying the data of pixel a by a coefficient "1" of the interpolation filter.

On the other hand, RGB data of a pixel corresponding to position b are obtained by multiplying data of eight pixel data around position b by coefficients of the interpolation filter. Since there is no pixel data actually photographed at position b, RGB data of the pixel corresponding to position b are obtained from the right and left neighboring pixel data of position b. Likewise, RGB data of a pixel corresponding to position c are obtained by multiplying data of eight pixel data around position c by coefficients of the interpolation filter. Since there is no pixel data actually photographed at position c, RGB data of the pixel corresponding to position c are obtained from the upper and lower neighboring pixel data of position c.

[Difference in Photographing Characteristics Depending on Pixel Shift Methods]

In this embodiment, the high-frequency component information of the image to be photographed, in other words, edge information, is analyzed, and pixel shift photographing is done by switching the pixel shift method in correspondence with the analysis result. The difference in image capture characteristics depending on the pixel shift methods will be explained below.

FIGS. 24A to 24D are views for briefly explaining the pixel shift method shown in FIG. 7. The pixel shift method shown in FIG. 7 is effective for the image to be photographed that contains many green high-frequency components, i.e., edge information.

Figure 24A:
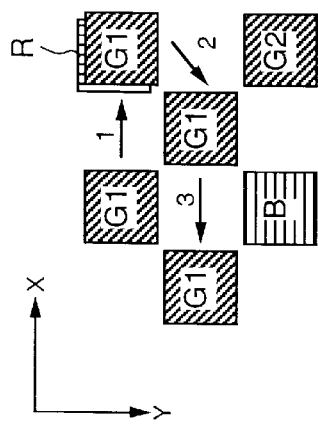
FIGS. 24A to 24D are views for explaining the pixel shift method shown in FIG. 7 in detail.

FIG. 24A shows the state before pixel shift, and the respective pixels are lined up in a Bayer pattern. G1 and G2 indicate green pixels, and R and B respectively red and blue pixels.

Figure 24B:
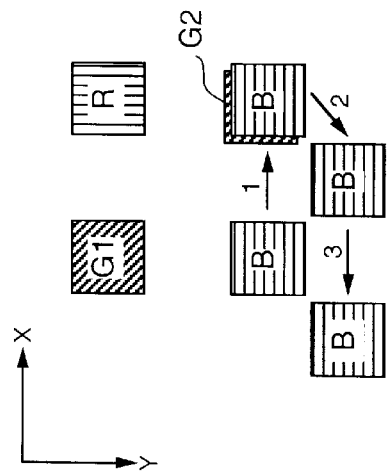
Figure 24C:
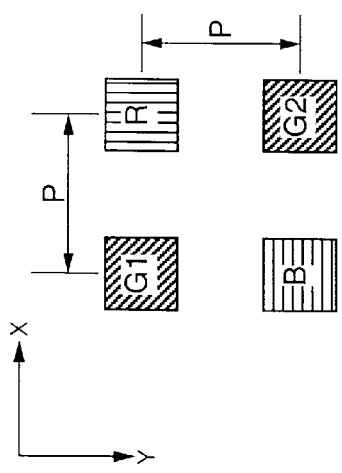
Figure 24D:
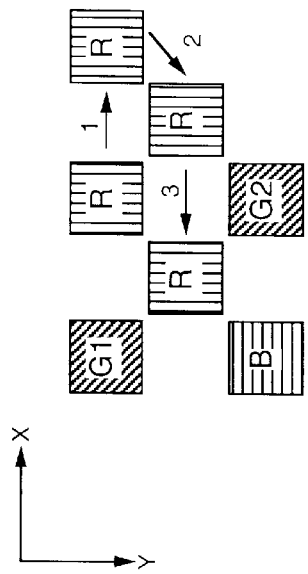

FIG. 24B shows the process for shifting pixel G1 by one pixel pitch P in the X-direction, by −P/2 in the X-direction and P/2 in the Y-direction, and by −P in the X-direction. FIGS. 24C and 24D respectively show the shift processes of pixels R and B by the same pixel shift procedure in FIG. 24B.

As can be seen from these figures, this pixel shift method is characterized in that the number of pixels is doubled in the X- and Y-directions as compared to that shown in FIG. 24A since pixel G1 is placed among pixels in the pixel array shown in FIG. 24A. As for pixels R and B, the number of pixels is doubled in the X-direction, but the pixel distribution becomes uneven in the Y-direction.

Hence, the pixel shift method shown in FIGS. 24A to 24D (or FIG. 7) is effective for an image to be photographed, which contains many green edge information, and is inappropriate when the image contains many red or blue edge information.

The pixel shift method effective for an image to be photographed which contains many red or blue edge information will be explained below with reference to FIGS. 25A to 25D. FIGS. 25A to 25D are views for briefly explaining the pixel shift method shown in FIG. 22.

FIG. 25A shows the state before pixel shift as in FIG. 24A, and the respective pixels are lined up in a Bayer pattern. FIG. 25B shows the process for shifting pixel GI by P in the X-direction, by P in the Y-direction, and by –P in the X-direction. FIGS. 25C and 25D respectively show the shift processes of pixels R and B by the same pixel shift procedure as in FIG. 25B.

As can be seen from these figures, this pixel shift method is characterized in that the resolution is doubled without making R and B pixel distributions uneven. As for pixel G, the resolution is doubled, but since double shift pixel G1 nearly overlaps the position of pixel G2, improvement in resolution by pixel shift is smaller than pixels R and B.

Hence, the pixel shift method shown in FIGS. 25A to 25D (or FIG. 22) is not suitable for an image to be photographed which contains many green edge information, but is effective for an image that contains many red or blue edge information.

To restate, according to this embodiment, an imaging apparatus and method which detect the characteristics of an object to be photographed, set a photographing method corresponding to the detected characteristics, and can capture a high-resolution image with low cost, can be provided.

Note that the setting method of the photographing method in correspondence with the object characteristics of this embodiment can be applied to "photographing storage mode 2" in the first to third embodiments described above.

As many apparently widely different embodiments of the present invention can be made without departing from the spirit and scope thereof, it is to be understood that the invention is not limited to the specific embodiments thereof except as defined in the appended claims.

What is claimed is:

1. An imaging apparatus having an imaging unit which forms an object image, and generates an image signal by photoelectric conversion, an optical shift unit which optically shifts an imaging position of the object image in said imaging unit, a generation unit which generates a single image from a plurality of images obtained by said imaging unit by a plurality of shifts using said optical shift unit, and a storage unit which converts an image obtained by said image unit or the image generated by said generation unit into a predetermined data format, and stores the converted image in a storage medium, said apparatus comprising:

a detection unit which detects spatial frequency characteristics of the image signal obtained by said imaging unit; and a control unit which sets the data format and controls supply of an image to said storage unit in correspondence with the detected spatial frequency characteristics.

2. The apparatus according to claim 1, wherein the data format includes image compression.

3. The apparatus according to claim 1, wherein said detection unit detects high frequency components of the image signal obtained by said imaging unit.

4. The apparatus according to claim 1, wherein, said detection unit detects the characteristics of an object on the basis of the image signal obtained by said imaging unit.

5. The apparatus according to claim 1, further comprising a correction unit which corrects an influence of vibration on said apparatus using said optical shift unit, and wherein said generation unit drives said optical shift unit via said correction unit to capture the plurality of images.

6. The apparatus according to claim 1, wherein said control unit sets the data format and controls the supply of the image in consideration of free storage capacity of said storage medium.

7. The apparatus according to claim 6, wherein said control unit sets a data format with a high compression rate and supplies the image obtained by said imaging unit to said storage unit irrespective of a photographing mode set by an operation unit when the free storage capacity of said storage medium is not more than a predetermined value.

8. An imaging method of an imaging apparatus having an imaging unit which forms an object image, and generates an image signal by photoelectric conversion, an optical shift unit which optically shifts an imaging position of the object image in the imaging unit, a generation unit which generates a single image from a plurality of images obtained by the imaging unit by a plurality of shifts using the optical shift unit, and a storage unit which converts an image obtained by the imaging unit or the image generated by the generation unit into a predetermined data format, and stores the converted image in a storage medium, the method comprising the steps of:

detecting spatial frequency characteristics of the image signal obtained by the imaging unit; and setting the data format, and controlling supply of an image to the storage unit in correspondence with the detected spatial frequency characteristics.

9. The method according to claim 8, wherein the setting and controlling step sets the data format; and controls the supply of the image in consideration of a free storage capacity of the storage medium.

10. The method according to claim 9, wherein when the free storage capacity of the storage medium is not more than a predetermined value, a data format with a high compression rate is set and the image obtained by the imaging unit is supplied to the storage unit irrespective of a photographing mode set by an operation unit.

11. A computer program product storing a computer readable medium comprising computer program code, for executing an image processing method of an imaging apparatus having an imaging unit which forms an object image, and generates an image signal by photoelectric conversion, an optical shift unit which optically shifts an imaging position of the object image in the imaging unit, a generation unit which generates a single image from a plurality of images obtained by the imaging unit by a plurality of shifts using the optical shift unit, and a storage unit which converts an image obtained by the imaging unit or the image generated by the generation unit into a predetermined data format, and stores the converted image in a storage medium, the computer program product comprising:

computer program code for detecting spatial frequency characteristics of the image signal obtained by the imaging unit; and computer program code for setting the data format; and controlling supply of an image to the storage unit in correspondence with the detected spatial frequency characteristics.

* * * * *